(12) United States Patent
Wei et al.

(10) Patent No.: US 8,233,386 B2
(45) Date of Patent: Jul. 31, 2012

(54) DEVICE THAT USES PARAMETERS TO PROVIDE MULTI-CHANNEL SERIAL DATA TRANSMISSIONS AND METHOD THEREOF

(75) Inventors: Bo Er Wei, Shing Tien (TW); Wei Shiau Suen, Shing Tien (TW)

(73) Assignee: Moxa, Inc. (TW)

( * ) Notice: Subject to any disclaimer, the term of this patent is extended or adjusted under 35 U.S.C. 154(b) by 406 days.

(21) Appl. No.: 12/646,779

(22) Filed: Dec. 23, 2009

(65) Prior Publication Data
US 2011/0153886 A1 Jun. 23, 2011

(51) Int. Cl.
*H04L 12/26* (2006.01)
(52) U.S. Cl. .................. 370/227; 370/437; 370/228
(58) Field of Classification Search .................. 370/389, 370/216, 227, 228, 231, 437, 239, 241
See application file for complete search history.

(56) References Cited

U.S. PATENT DOCUMENTS
7,921,222 B2 * 4/2011 Courtemanche ............. 709/231
2008/0273596 A1 * 11/2008 Oguz et al. ............... 375/240.13
* cited by examiner

*Primary Examiner* — Brenda H Pham
(74) *Attorney, Agent, or Firm* — David R. Stevens; Stevens Law Group

(57) ABSTRACT

A device that uses parameters to provide multi-channel serial data transmissions and the method thereof are provided. A first serial device configures with the channel parameters corresponding to a procedure executed on a second serial device. The invention determines whether the data channel corresponding to the procedure requires sending/receiving data occupies a physical line. If so, the first serial device transmits data to the second serial device. Otherwise, the first serial device transmits a channel switch request to the second serial device. After the first serial device and the second serial device are both switched the data channel corresponding to the procedure to occupy the physical line, the first serial device and the procedure could exchange data. Therefore, the first serial device could establish new connection without closing original connection. It achieves the goal of using a single serial port to have data channels of different operation modes or connections.

30 Claims, 10 Drawing Sheets

DEVICE THAT USES PARAMETERS TO PROVIDE MULTI-CHANNEL SERIAL DATA TRANSMISSIONS AND METHOD THEREOF

BACKGROUND OF THE INVENTION

1. Field of Invention

The invention relates to a data transmission device and the method thereof. In particular, the invention relates to a device that uses parameters to provide multi-channel serial data transmissions and the method thereof.

2. Related Art

A serial device is a device that has a serial port and can exchange data with other devices (usually a computer). Generally speaking, the serial port commonly used by the personal computer (PC) is RS-232. The serial ports commonly used by the industrial computer are half-duplex RS-485 and full-duplex RS-422. The serial device and other devices use physical lines as the media for transmitting data. Under normal conditions, the physical line is a serial circuit, with one end connected to the serial port on the serial device and the other end connected to the serial port of the other device.

Current device server connects to the serial device via a serial port too. The data received by the serial port is sent to the network end. It also sends the data from the network end to the serial port. Thus, the serial device and the network can exchange data. Generally speaking, the device server can provide different operation modes, such as TCP server, TCP client, etc, using its various serial ports, according to different ways of connecting the serial device to the network. The serial device can opt one of the operation modes according to the needs.

Currently, if the device server has to use different operation modes simultaneously, it can select its various serial ports to achieve it, provided there are several serial ports thereon. However, existing embedded device server usually has only one serial port. When the serial device connected to the embedded device server needs to use different operation modes for data transmissions, the embedded device server has to close the current connection or operation mode first and then it could establish new connection or operation mode. This is how it switches among different operation modes for the connected serial devices. However, such a mechanism takes some extra time for initializing the operation mode. It is therefore very inconvenient and inefficient.

In summary, the prior art always has the problem that when serial devices of different operation modes use a single serial port to communicate with other serial devices, the two serial devices have to waste time on switching between the two operation modes. It is therefore more desirable to provide a better solution.

SUMMARY OF THE INVENTION

In view of the foregoing, the invention provides a device that uses parameters to provide multi-channel serial data transmissions and the method thereof.

The disclosed device that uses parameters to provide multi-channel serial data transmissions includes at least: a first transmitting interface connected with a physical line; a first data dispatching module connected with the first transmitting interface; a parameter configuring module for configuring at least one channel parameter corresponding to a procedure according to at least one environmental parameter received by the first data dispatching module, the environmental parameter corresponding to the procedure and the channel parameter corresponding to at least one data channel; a first determining module for determining whether the data channel occupies the physical line when the device needs to transmit first data to the procedure; a first channel switching module for generating a channel switch request corresponding to the channel parameter when the first determining module determines that the data channel does not occupy the physical line, switching the data channel to occupy the physical line, and switching the data channel to occupy the physical line according to the channel switch request received by the first data dispatching module via the first transmitting interface; a data processing module for processing the second data received by the first data dispatching module via the first transmitting interface according to the data channel that occupies the physical line; a first transmitting module for transmitting the channel switch request to the second serial device via the first transmitting interface when the first determining module determines that the data channel does not occupy the physical line and transmitting the first data to the second serial device via the first transmitting interface when the first determining module determines that the data channel occupies the physical line.

Another device that uses parameters to provide multi-channel serial data transmissions according to the invention includes at least: a first serial device and a second serial device. The first serial device includes: a first transmitting interface connected with a physical line; a first data dispatching module connected with the first transmitting interface; a parameter configuring module for configuring at least one channel parameter corresponding to a procedure according to at least one environmental parameter received by the first data dispatching module, the channel parameter corresponding to at least one data channel; a first determining module for determining whether the data channel occupies the physical line when the first serial device needs to send the first data to the procedure; a first channel switching module, which generates a channel switch request corresponding to the channel parameter when the first determining module determines that the data channel does not occupy the physical line and switches the data channel to occupy the physical line, and switches the data channel to occupy the physical line according to the channel switch request received by the first data dispatching module via the first transmitting interface; a data processing module for processing the second data received by the first data dispatching module via the first transmitting interface according to the data channel that occupies the physical line; and a first transmitting module, which transmits the channel switch request via the first transmitting interface when the first determining module determines that the data channel does not occupy the physical line, and transmits the first data via the first transmitting interface when the first determining module determines that the data channel occupies the physical line. The second serial device includes: a second transmitting interface connected with the first transmitting interface via the physical line; a procedure executing module for executing the procedure; a second data dispatching module connected with the second transmitting interface for receiving the channel switch request and the first data via the second transmitting interface and dispatching the first data to the procedure executing module; a second determining module for determining whether the data channel occupies the physical line when the procedure generates the second data; a second channel switching module, which generates a channel switch request when the second determining module determines that the data channel does not occupy the physical line and switches the data channel to occupy the physical line, and switches the data channel to occupy the physical line according to the channel switch request received by the second data dispatching module via the second transmitting interface; a second transmitting module, which transmits a channel switch request via the second transmitting interface when the second determining module determines that the data channel does not occupy the physical line, and transmits the second data to the first serial device via the second transmitting interface when the second determining module determines that the data channel occupies the physical line.

The disclosed method of using parameters to provide multi-channels to transmit serial data includes the steps of: connecting a first serial device and a second serial device executing at least one procedure by a physical line; first serial device configures at least one channel parameter corresponding to the procedure; generating a channel switch request corresponding to the channel parameter when the first serial device determines that the physical line is not occupied by the data channel corresponding to the channel parameter; sending the channel switch request from the first serial device to the second serial device via the physical line; switching the data channel to occupy the physical line by the first serial device and the second serial device; transmitting data via the data channel from the first serial device to the second serial device; and dispatching data to the procedure corresponding to the data channel by the second serial device.

Another method of using parameters to provide multi-channels to transmit serial data according to the invention includes the steps of: connecting a first serial device and a second serial device executing at least one procedure by a physical line; first serial device configures at least one channel parameter corresponding to the procedure; transmitting data corresponding to the procedure via the data channel to the first serial device when the second serial device determines that the physical line is occupied by the data channel corresponding to the channel parameter; generating a channel switch request corresponding to the channel parameter when the second serial device determines that the physical line is not occupied by the data channel; transmitting the channel switch request from the second serial device to the first serial device; switching the data channel to occupy the physical line by the first serial device and the second serial device; and transmitting data via the data channel from the second serial device to the first serial device.

As described above, the disclosed system and method differ from the prior art in that the invention configures on the first serial device a channel parameter corresponding to the procedure to be executed on the second serial device. When transmitting data to the procedure, it determines whether the data channel for transmitting the data for the procedure occupies the physical line. If so, the first serial device transmits data to the procedure on the second serial device. Otherwise, the first serial device transmits a channel switch request to the second serial device. After both the first serial device and the second serial device set the physical line to be occupied by the data channel corresponding to the procedure, the first serial device and the procedure on the second serial device exchange data. This solves the problems in the prior art. A single serial port can have several data channels using different operation modes.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
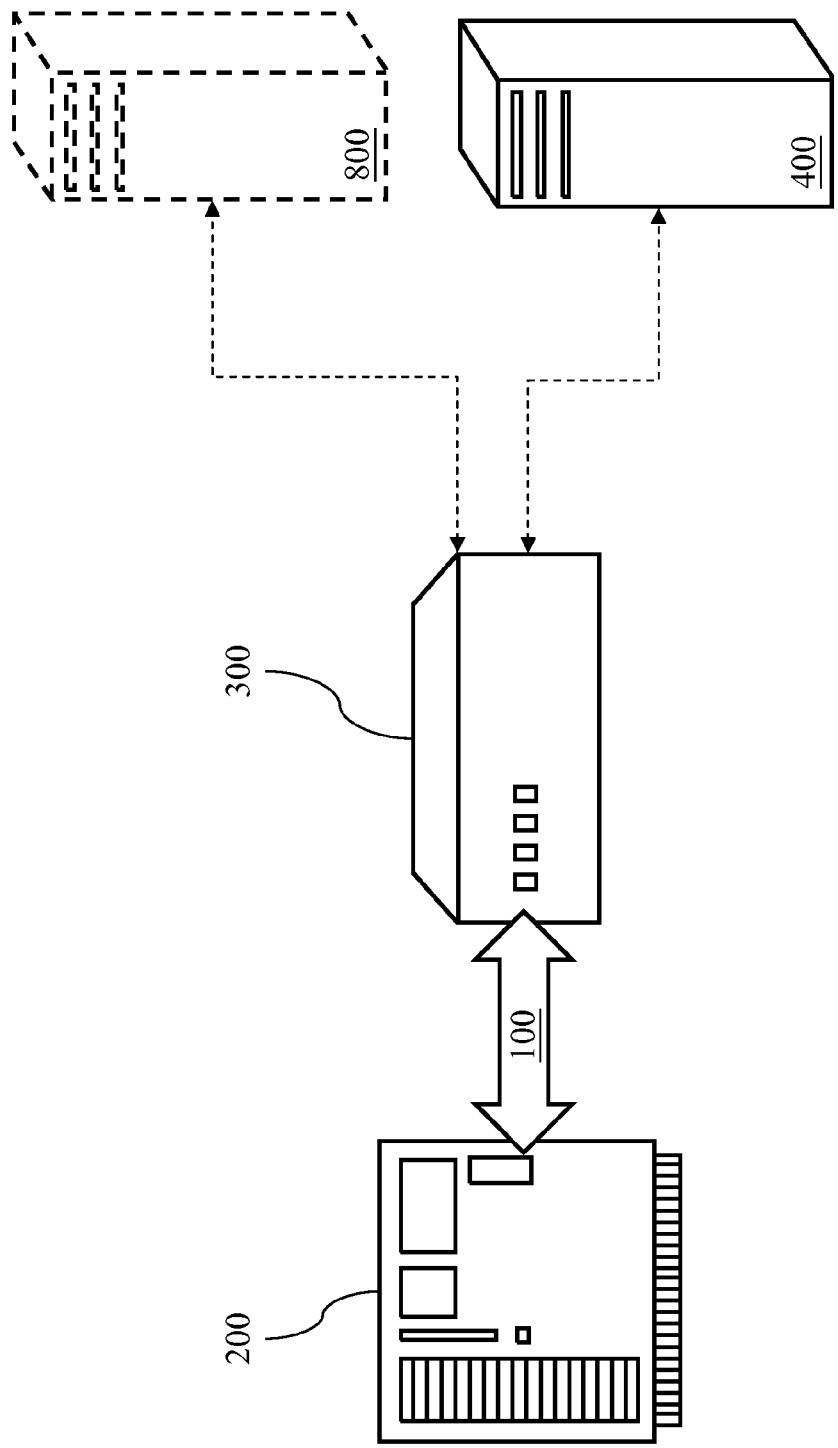
FIG. 1 shows the structure of the disclosed system of using parameters to provide multi-channel serial data transmissions.

FIG. 1 shows the structure of the disclosed system of using parameters to provide multi-channel serial data transmissions. As shown in the drawing, the disclosed system includes a physical line 100, a second serial device 200, and a first serial device 300. In fact, the invention is built on a conventional system. Therefore, the system structure of the invention is the same as the prior art. The first serial device 300 and the second serial device 200 are connected by a physical line 100. However, the conventional physical line 100 does not allow several procedures to exchange data with the first serial device 300 at the same time (In the following, we cell this situation as "shared physical line".) Therefore, in order for the different procedures executing on the second serial device 200 to share the physical line 100 concurrently, some parts of the second serial device 200 and the first serial device 300 of the invention are different from the prior art. The procedure executed on the second serial device 200 is composed by some computer instructs, such as a program, a process or a thread, etc.

Besides, using the invention, the procedure executing on the second serial device 200 can further use the physical line 100 to exchange different data with different network devices (e.g., remote server 400 and remote server 800) via the first serial device 300 at the same time. The operations of the invention are detailed with reference to FIGS. 1, 2A, and 2B.

The invention enables different procedures simultaneously executing on the second serial device 200 to share the physical line 100. The physical line 100 is a serial circuit to be connected with the serial device 200. Its one end connects to the second serial device 200, and its other end connects to the first serial device 300. The second serial device 200 and the first serial device 300 exchange data via the physical line 100.

Figure 3A:
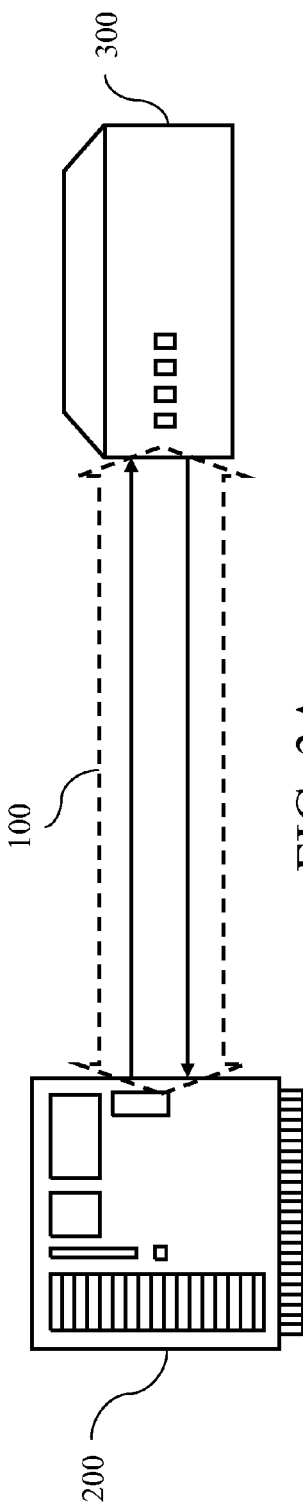
FIG. 3A is a schematic view of the physical line in the conventional full-duplex line.
Figure 3B:
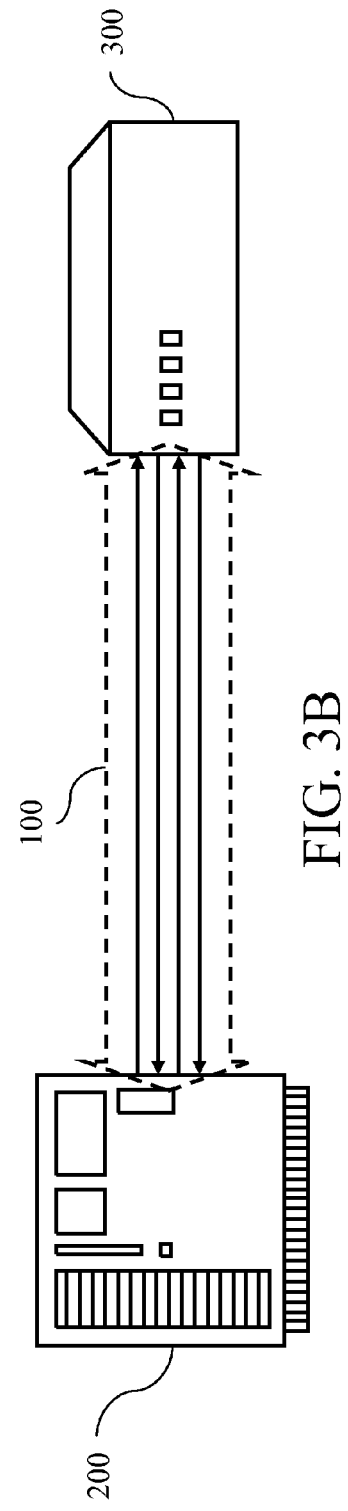
FIG. 3B is a schematic view of the physical line in the conventional full-duplex line that includes control lines.

The physical line 100 can have more than one circuit. If the physical line 100 has only one circuit, then the second serial device 200 and the first serial device 300 transmit data in different directions in half-duplex by time division multiple access (TDMA). If the physical line 100, as shown in FIG. 3A, has two circuits, then the second serial device 200 and the first serial device 300 use different circuits to transmit data in different directions, achieving full-duplex. If the physical line 100, as shown in FIG. 3B, has three or more circuits, then the second serial device 200 and the first serial device 300 use two of them to transmit data and use the others to transmit control signals. In this invention, physical line 100 may includes one or more electric cables which are connected the first serial device 300 and the second serial device 200.

In fact, the structure of the physical line 100 is the same as in the prior art. Therefore, the physical line 100 by itself cannot allow different procedures executing on the second serial device 200 to exchange data with the first serial device 300. That is, only one procedure executing on the second serial device 200 can use the circuit in the physical line 100 to exchange data with the first serial device 300 at a time. Therefore, in order for different procedures to share the physical line 100 at a time, some extra processing is required when exchanging data between the second serial device 200 and the first serial device 300. The extra processing done by the second serial device 200 and the first serial device 300 in this invention is to define a data channel for each of the procedures. When each of the procedures needs to transmit data, the invention switches the data channel to occupy the physical line 100. Generally speaking, the second serial device 200 and the first serial device 300 use a channel parameter to record which procedure is using the physical line 100. When the second serial device 200 and the first serial device 300 record the same channel parameter, it means that the physical line 100 is occupied by the data channel corresponding to the channel parameter.

The procedure executing on the second serial device 200 and the first serial device 300 exchange data according to the channel parameter of the procedure. The channel parameter corresponding to the procedure executing on the second serial device 200 refers to the channel parameter used by the procedure executing on the second serial device 200. One channel parameter can only be used by a corresponding procedure at a time. However, a procedure may use several channel parameters. That is, one procedure may correspond to several channel parameters. The channel parameters associated with the procedures executing on the second serial device 200 are predetermined by the procedure developers. They are usually numbers. However, the invention is not limited to this possibility. For example, they can be English letters as well.

Before some procedure executing on the second serial device 200 exchanges data with the first serial device 300 via the physical line 100, the second serial device 200 and the first serial device 300 first determine whether the data channel occupying the physical line 100 corresponds to the procedure, to avoid the situation where the data being transmitted cannot be associated with any of the procedures. In this invention, the data channel is used to describe the virtual connection generated after the second serial device 200 and the first serial device 300 record the channel parameter. The data channel occupying the physical line 100 refers to the channel parameter recorded by the second serial device 200 and the first serial device 300, so that the procedure corresponding to the recorded channel parameter can exchange data with the first serial device 300 via the physical line 100. In particular, the channel parameter corresponds to the procedure executing in the second serial device 200. Therefore, the data channel also corresponds to the procedure executing on the second serial device 200. Besides, the invention enables a procedure executing on the second serial device 200 to exchange data with different devices via different data channels.

Figure 2A:
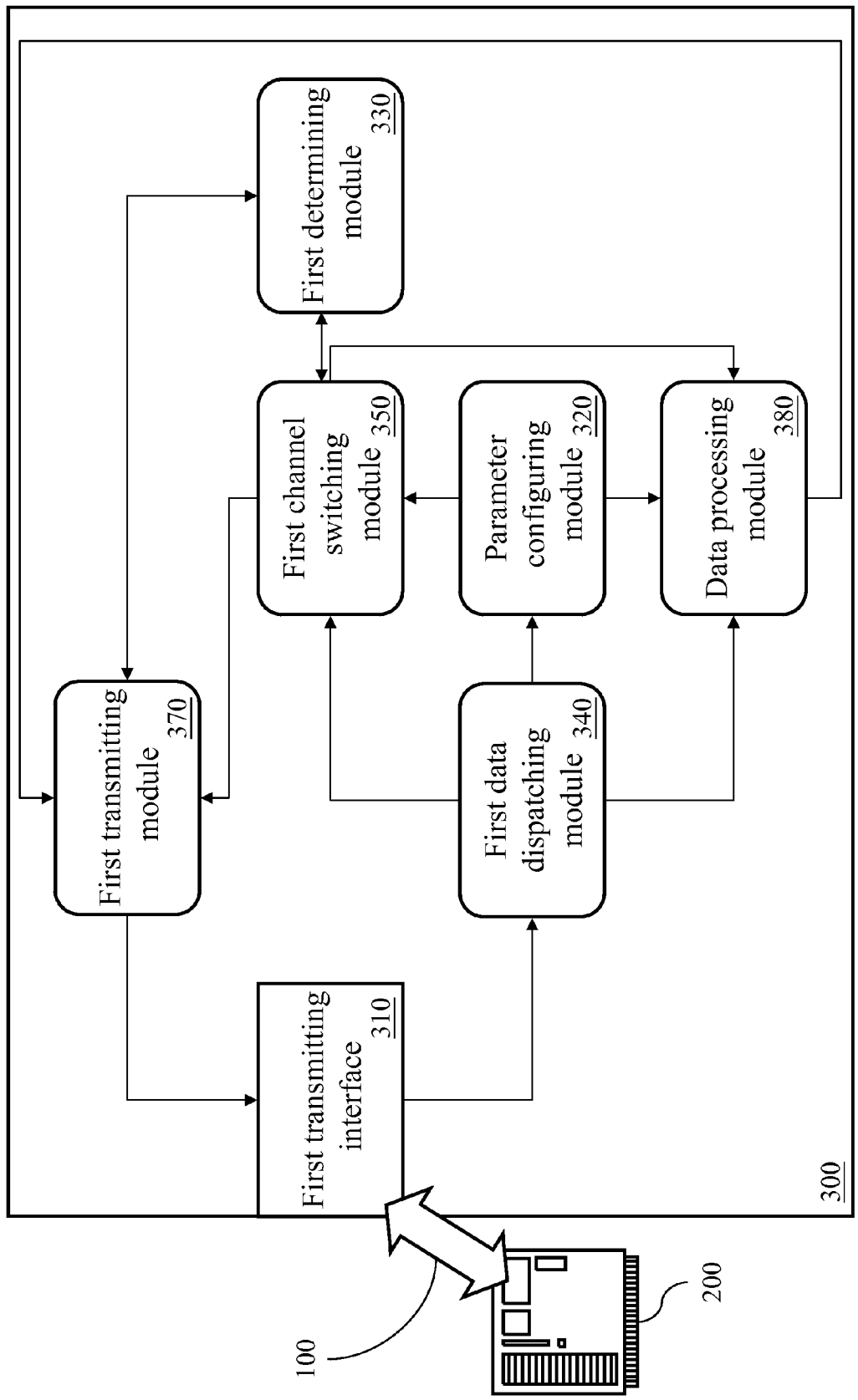
FIG. 2A is a schematic view showing the elements in the first serial device of the disclosed system.

The elements in the first serial device 300 are shown in FIG. 2A. It includes a first transmitting interface 310, a parameter configuring module 320, a first determining module 330, a first data dispatching module 340, a first channel switching module 350, a first transmitting module 370, and a data processing module 380.

The first transmitting interface 310 connects to the physical line 100. Since the physical line 100 is a serial circuit, the first transmitting interface 310 may be in the form of a serial port for the physical line 100 to connect. Or the physical line 100 is directly soldered onto the first serial device 300. The invention does not impose any restriction on this. The connection to the first transmitting interface 310 can be in any form, as long as data can be transmitted over the physical line 100.

The first transmitting module 370 transmits data via the first transmitting interface 310 to the second serial device 200. The data transmitted by the first transmitting module 370 to the second serial device 200 could be the data for the procedure executing by the procedure executing module 230, the channel switch request sent to the second channel switching module 260, etc. They can even be the response message corresponding to the channel switch request transmitted by the second channel switching module 260. In particular, the channel switch request would make the second serial device 200 switch the data channel occupying the physical line 100. It should be mentioned that the first transmitting module 370 transmits data to the corresponding procedure only after the first determining module 330 determines that the physical line 100 is occupied by the data channel, and the data channel corresponds to the procedure that needs the data.

The first determining module 330 determines whether the data channel currently occupying the physical line 100 corresponds to the procedure that generates the data to be transmitted. For example, the first determining module 330 determines whether the first byte of the data to be transmitted is the same as the channel parameter in the data channel that occupies the physical line 100 before the first transmitting module 370 transmits data to the second serial device 200. If they are the same, then the data channel currently occupying the physical line 100 corresponds to the procedure that generates data to be transmitted. Otherwise, they do not correspond to each other. In this case, the first transmitting module 370 does not transmit the first byte of the data to be transmitted to the first transmitting interface 310. In particular, the method that the first determining module 330 determines whether the data channel current occupying the physical line 100 corresponds to the procedure that generates data to be transmitted is not limited to the above-mentioned one.

If the first determining module 330 determines that the data channel currently occupying the physical line 100 corresponds to the procedure that generates data to be transmitted, then the first transmitting module 370 transmits the data via the first transmitting interface 310 to the second serial device 200. If the first determining module 330 determines that there is no correspondence, then it enables the first channel switching module 350 to switch the data channel. After the first channel switching module completes the data channel switch, it further enables the first transmitting module 370 to transmit the data via the first transmitting interface 310 to the second serial device 200. That is, suppose the second serial device 200 is executing a first procedure and a second procedure at the same time. When the first transmitting module 370 needs to transmit data to the first procedure, the first determining module 330 determines whether the physical line 100 is occupied by the first data channel corresponding to the first procedure, and then determines whether to enable the first channel switching module 350 to switch the data channel before enable the first transmitting module 370 to send out data.

The data channel in the invention is a virtual connection. That is, in the invention whether the physical line 100 is occupied by a data channel is represented by the channel parameters recorded in the first serial device 300 and the second serial device 200. Therefore, the first determining module 330 only needs to check the channel parameter recorded on the first serial device 300 in order to know which data channel occupies the physical line 100. For example, suppose the channel parameter corresponding to the first procedure is "0x01". The first determining module 330 determines whether the first data channel corresponding to the first procedure occupies the physical line 100 by checking whether the channel parameter recorded in the first serial device 300 is "0x01".

The first data dispatching module 340 determines the type of received data from the header thereof when the first transmitting interface 310 receives the data. It then transfers the data to the corresponding module in the first serial device 300 for subsequent processing.

For example, if the first byte of the received data is "0x10" and the second byte is not "0x10", then the data represent a channel switch request or a response message corresponding to the channel switch request. After removing the header (i.e., the first byte "0x10"), the first data dispatching module 340 transfers the data to the first channel switching module 350 for subsequent processing. If the first byte of the received data is "0x11" and the second byte is not "0x11", then the data represent an environmental parameter. After removing the header (i.e., the first byte "0x11"), the first data dispatching module 340 transfers the data to the parameter configuring module 320 for subsequent processing. If the first byte of the received data is neither of the above, then the data represent the data transmitted via the current data channel for the procedure executing on the second serial device 200. The first data dispatching module 340 directly transfers the data to the data processing module 380 for subsequent processing. It is noted that the above-mentioned header in the data is only an example. The invention is not limited to this possibility.

The parameter configuring module 320 configures the channel parameter corresponding to the procedure executing on the second serial device 200. The procedure executing on the second serial device 200 and the channel parameter have a one-to-one or one-to-many correspondence relation. That is, the parameter configuring module 320 configures one or more channel parameters for the procedure executing on the second serial device 200.

The parameter configuring module 320 also configures the environmental parameters corresponding to various channel parameters after it receives the environmental parameters transmitted from the first data dispatching module 340. The environmental parameters configured by the parameter configuring module 320 include, but not limited to, the IP address and TCP/UDP port number of the external server that the first serial device 300 transfers data to, the IP address of the external client that the first serial device 300 receives data from, the operation mode of the channel, accessible IP list, and the time interval for reconnection. The environmental parameters are set by the developer on the second serial device 200. The second serial device 200 then transmits them to the first transmitting interface 310 via the physical line 100.

The environmental parameters can also be set by other devices via the network. Since the channel parameter corresponds to the procedure executing on the second serial device 200 and to the environmental parameters as well, the environmental parameters therefore also correspond to the procedure executing on the second serial device 200.

After receiving the data transmitted from the second serial device 200 and then forwarded by the first data dispatching module 340, the data processing module 380 performs corresponding processing according to the data channel occupying the physical line 100. For example, when the second data channel occupies the physical line 100, the data processing module 380 would transmit the data forwarded by the first data dispatching module 340 to the remote server 400 recorded in the environmental parameters corresponding to the second data channel via network. Or when the first data channel occupies the physical line 100, the data processing module 380 sets the operating environment of the first serial device using the data/environmental parameters transferred from the first data dispatching module 340.

Beside, after receiving the data (e.g., data transmitted from the remote server 400 via the network) for the procedure executing on the second serial device 200 or the data generated by the first serial device 300 to be transmitted to the second serial device 200, the data processing module 380 can also forward the data via the first transmitting module 370 to the second serial device 200. For example, when the first serial device 300 receives the data transmitted from the remote server 400, the data processing module 380 would find the matched environmental parameters according to the identification info (e.g., IP address, connection protocol and/or TCP/UDP port, etc) of the remote server 400. Then, the data would be sent in the data channel (e.g., second data channel) corresponding to the matched environmental parameters to the second serial device 200. It is notice that the data processing module 380 would add a byte which indicates the channel parameter before the first byte of the data to be forward to the first transmitting module 370.

The first channel switching module 350 switches the physical line 100 to the data channel of the procedure that first serial device 300 would like transmit data to (e.g., switching according to the channel parameter corresponding to the procedure to transmit data) when the target procedure changes (i.e., when the first determining module 330 determines that the data channel occupying the physical line 100 does not equal to or correspond to the channel parameter got from data processing module 380). It also generates a channel switch request and transmits it to the second serial device 200, so that the second serial device 200 knows that the data are transmitted for a different procedure after the channel switch request. For example, suppose the physical line 100 is occupied by the second data channel. If the first serial device 300 receives data to be transmitted to the first procedure, the first determining module 330 determines that the physical line 100 is currently used by the second data channel, therefore the first channel switching module 350 records a first channel parameter to switch the physical line 100 to the first data channel. It also generates a channel switch request. After the second serial device 200 receives the channel switch request and records the first channel parameter to switch the physical line 100 to the first data channel, the first data channel then occupies the physical line 100. In particular, after receiving the channel switch request, the second serial device 200 could further returns a response message to the first serial device 300 to confirm that channel switch was done. When the response message is required, the first channel switching module 350 records the channel parameter only after the response message from the serial device 200 is received. Otherwise, the first channel switching module 350 records the channel parameter at the same time while generating the channel switch request.

After the first data dispatching module 340 forwards the channel switch request sent from the second serial device 200 to the first channel switching module 350, the first channel switching module 350 switches the physical line 100 to the data channel corresponding to the channel parameter in the channel switch request. When the second serial device 200 also records the channel parameter, the data channel corresponding to the channel parameter then occupies the physical line 100. The first channel switching module 350 also could further generate a response message to confirm that channel switch was done after receiving the channel switch request.

Figure 2B:
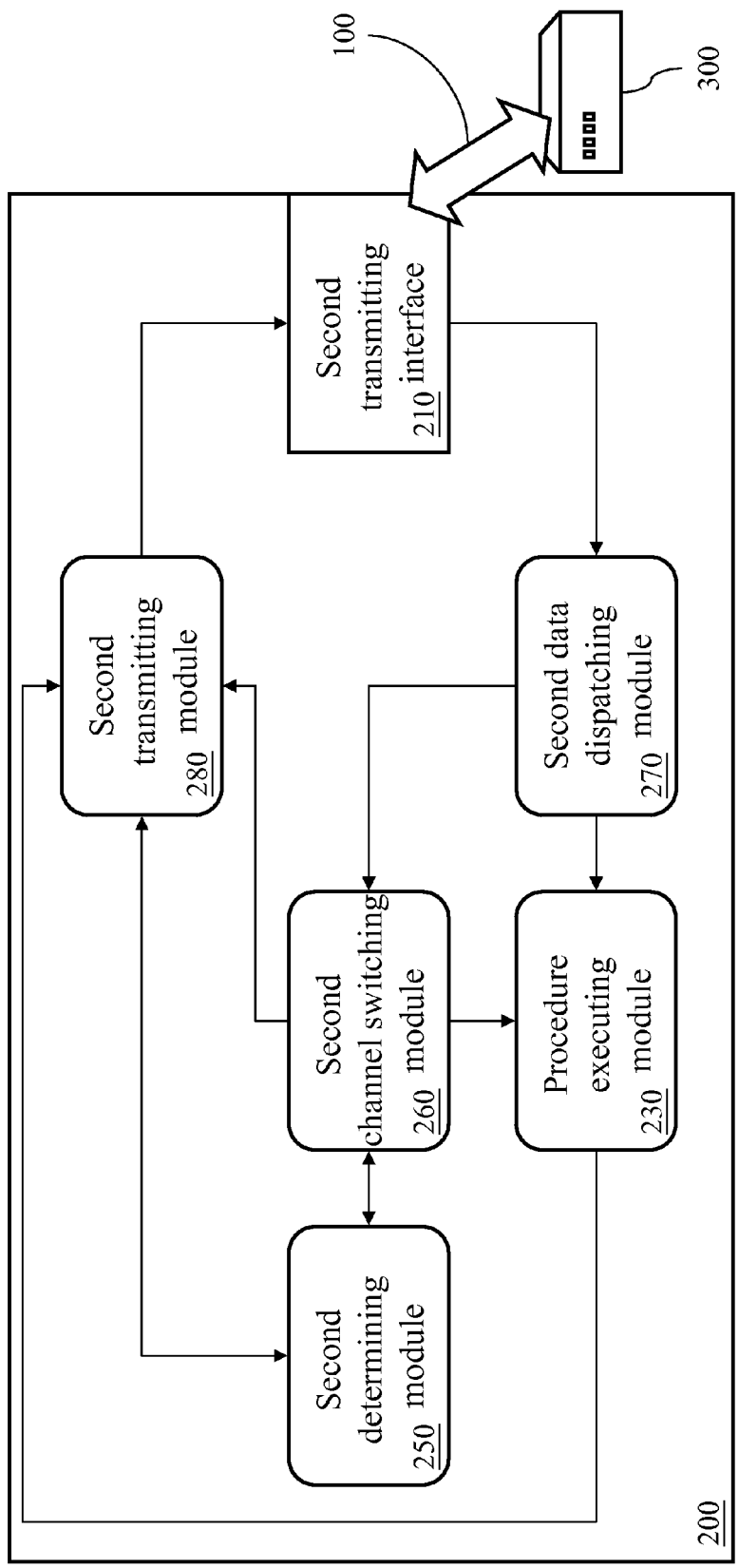
FIG. 2B is a schematic view showing the elements in the second serial device of the disclosed system.

The elements of the second serial device 200 are shown in FIG. 2B. It includes: a second transmitting interface 210, a procedure executing module 230, a second determining module 250, a second channel switching module 260, a second data dispatching module 270, and a second transmitting module 280.

The second transmitting interface 210 connects to the physical line 100. Since the physical line 100 is a serial circuit, the second transmitting interface 210 is similar to the first transmitting interface 310 of the first serial device 300. It may be in the form of a serial port to connect with the physical line 100. The physical line 100 can also be directly soldered onto the second serial device 200. However, the invention is not limited to these possibilities. Any method that allows data to be transmitted on the physical line 100 can be the connection form of the second transmitting interface 210.

The second transmitting interface 210 transmits data generated by the procedures executing on the second serial device 200 to the first serial device 300 via the physical line 100, or receives the data sent from the first serial device 300 to the procedures executing on the second serial device 200 via the physical line 100.

Besides, the second transmitting interface 210 also provides function for transmitting the environmental parameters which user set corresponding to the channel parameters to the first serial device 300, after the second transmitting interface 210 is connected with the first serial device 300 via the physical line 100 and before the first serial device 300 transmit data.

The second transmitting module 280 transmits the data for the first serial device 300 via the second transmitting interface 210 to the first serial device 300. The data transmitted by the second transmitting module 280 contains, but not limited to, the data generated by the procedure executing in the procedure executing module 230 and the channel switch request generated by the second channel switching module 260, or the response message corresponding to the channel switch request.

The procedure executing module 230 executes procedures. If there are two or more procedures to be executed simultaneously, the procedure executing module 230 can execute them in the way that conventional processors process multiple procedures. The procedure executing module 230 also sends the data generated by the procedures for the first serial device 300 to the second transmitting module 280 for subsequent transmissions.

The second data dispatching module 270 is similar to the first data dispatching module 340. After the second transmitting interface 210 receives the data transmitted from the first serial device 300, the second data dispatching module 270 uses the header in the received data to determine the data type. The data are then transferred to the second channel switching module 260 or the procedure executing module 230 for subsequent processing. For example, if the first byte of the received data is "0x10" and its second byte is not "0x10", then the data would be a channel switch request or channel switch response. After above data was received, the second data dispatching module 270 would transmit the data to the second channel switching module 260 for subsequent processing. If the received data are not as the above-mentioned, then the data belong to the current data channel. The second data dispatching module 270 would forward the data to the procedure executing module 230 so that the procedure corresponding to the data channel occupying the physical line 100 could process it. That is, when the second data channel occupies the physical line 100 and if the second transmitting interface 210 receives data, then the second data dispatching module 270 provides the data to the second procedure.

The second determining module 250 is similar to the first determining module 330. It determines whether the data channel occupying the physical line 100 corresponds to the procedure that generates data to be transmitted. Generally speaking, the second determining module 250 does the above determination before the second transmitting module 280 could transmit data to the first serial device 300. If the second determining module 250 determines that the data channel currently occupying the physical line 100 corresponds to the procedure that generates data to be transmitted, then it enables the second transmitting module 280 to transmit the data to the first serial device 300 via the second transmitting interface 210. If the second determining module 250 determines that they do not correspond to each other, then it enables the second channel switching module 260 to switch the data channel. After the second channel switching module 260 completes the channel switch, it enables the second transmitting module 280 to transmit the data to the first serial device 300 via the second transmitting interface 210. That is, when the procedure executing module 230 simultaneously executes a first procedure and a second procedure and the first procedure generates data to be sent to the first serial device 300, the second determining module 250 determines whether the physical line 100 is occupied by the first data channel corresponding to the first procedure. As the first determining module 330, the second determining module 250 only needs to determine whether the channel parameter recorded on the second serial device 200 is the same as the channel parameter "0x01" corresponding to the first procedure, in order to determine whether the first channel corresponding to the first procedure occupies the physical line 100. This determines whether the second channel switching module 260 should be first enabled to switch the data channel before enabling the second transmitting module to send out data.

The second channel switching module 260 generates a channel switch request and sends the channel switch request to the first serial device 300 when the procedure to transmit data changes (i.e., when the second determining module 250 determines that the data channel occupying the physical line 100 differ from the procedure that generates data to be transmitted). The first channel switching module 350 in the first serial device 300 records the channel parameter in the channel switch request after the first data dispatching module 340 receives the channel switch request. At the same time, the second channel switching module 260 also records the channel parameter corresponding to the procedure that generates data to be transmitted, so that the physical line 100 is occupied by the first data channel. If the system requires that first serial device 300 returns a channel switch response, the second channel switching module 260 records the channel parameter after it receives the response of the first serial device 300.

Otherwise, the second channel switching module 260 records the channel parameter while generating the channel switch request.

For example, when the physical line 100 is occupied by the second data channel and the first procedure generates data that need to be transmitted to the first serial device 300, then the second determining module 250 would find that the physical line 100 is currently occupied by the second data channel. Therefore, the second channel switching module 260 would records the first data channel parameter after the second channel switching module 260 generates and sends out a channel switch request that switches the data channel to the first data channel. The channel switch request would include the channel parameter corresponding to the procedure to transmit data (e.g., when the channel parameter of the first procedure is "0x01", then the channel switch request includes a byte equals to "0x01").

The second channel switching module 260 also records the channel parameter in the channel switch request after the second channel switching module 260 receives the channel switch request transmitted from the first serial device 300 and forwarded by the second data dispatching module 270. The data channel represented by the channel parameter then occupies the physical line 100.

This paragraph describes how the first serial device 300 and the second serial device 200 exchange data via the physical line 100. If the physical line 100 has only one half-duplex or two full-duplex lines for transmitting data and no additional lines for transmitting control signals, the first transmitting module 370/the second transmitting module 280 adds the header 510 in FIG. 4 to the channel switch request generated by the first channel switching module 350/the second channel switching module 260. After the second data dispatching module 270 in the second serial device 200/the first data dispatching module 340 in the first serial device 300 receives a packet in the packet format 500 of FIG. 4, the invention can determine that the content in the received packet is a channel switch request, not ordinary data. The first channel switching module 350 and the second channel switching module 260 would record the channel parameter. Therefore, the data processing module 380/the procedure executing module 230 could know the data channel corresponds to the data that the first data dispatching module 340/the second data dispatching module 270 transmit from the channel parameter recorded in the first channel switching module 350 and the second channel switching module 260. The first transmitting module 370/the second transmitting module 280 can even add a header 510 to the channel switch request and then add the data to be transmitted afterwards. In this case, the header 510, the channel switch request, and the data to be transmitted are transmitted in the same packet instead of separately. If the subsequently transmitted data also correspond to the same data channel, then it isn't required to add the header 510 before each message unless the data channel is required to be switched, as shown in FIG. 5.

Figure 4:
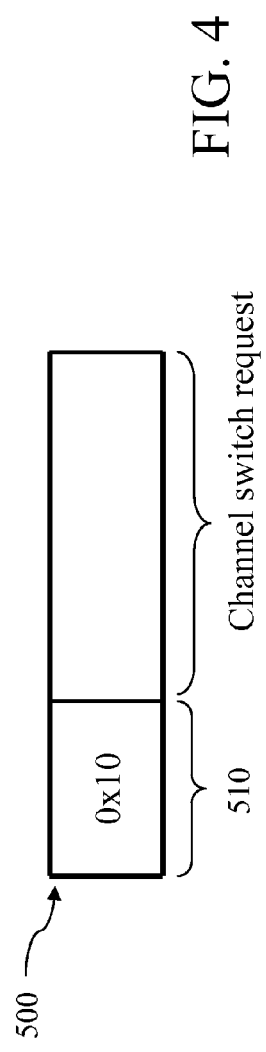
FIG. 4 is a schematic view of the packet structure according to the invention.
Figure 5:
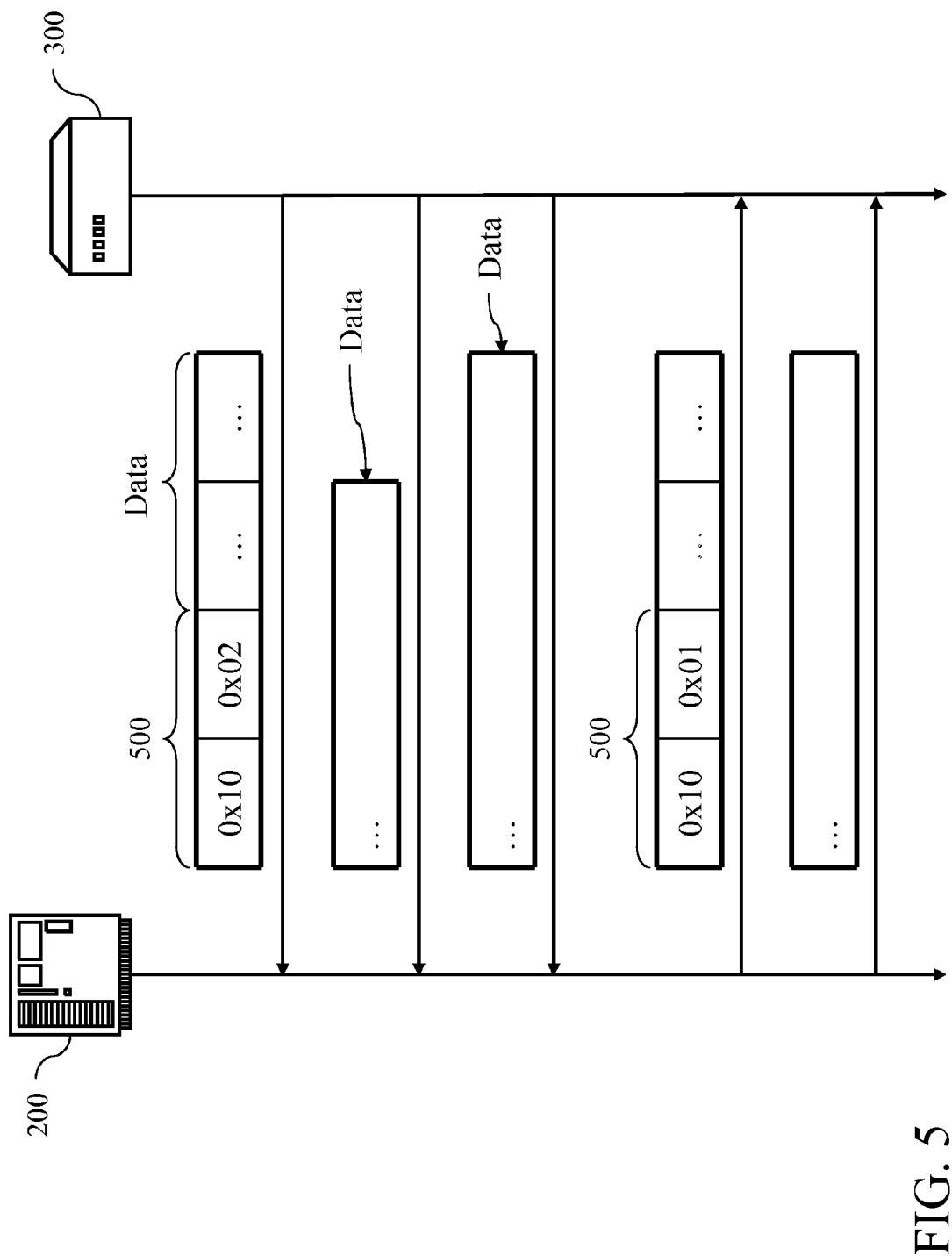
FIG. 5 is a sequence diagram of packet transmissions according to the invention.

Moreover, the header in FIG. 4 "0x10" can be substituted by some other value or a break signal. The invention is not limited to such possibilities. The break signal is a logical 0 for longer than one frame/character time logic 0. If a frame/character includes one start bit, seven data bits, one parity bit, and one stop bit, then a frame/character length is totally 10 bits. This means that the first transmitting module 370/the second transmitting module 280 only needs to transmit a break signal, logical 0 is longer than 10 bits, as the header. It should be noticed that if the physical line 100 has only two circuits for transmitting data in opposite directions, then when the packet transmitted over the lines includes a channel switch request and data to be transmitted, the data processing module 380/the procedure executing module 230 can determine the procedure corresponding to the data from the channel switch request in the same packet. Thus, the two circuits could be occupied by different data channels at the same time.

Suppose the circuit for transmitting control signals and the circuit for transmitting data in the physical line 100 are different. This situation often occurs when the physical line 100 has three or more circuits. Therefore, in addition to using two circuits for transmitting data in opposite directions, the physical line 100 has additional circuits for transmitting control signals. As a result, the first transmitting module 370 can use the additional circuits not for transmitting data in the physical line 100 to transmit the channel switch request or to help switching data channels. Then there is no need for adding the header 510 in this situation.

Under the above-mentioned condition, when the first transmitting module 370/the second transmitting module 280 transmit the channel switch request, the physical line 100 cannot be occupied by any data channel. Otherwise, the channel switch request would be misidentified as data. That is, when the first transmitting module 370 needs to transmit data, the physical line 100 is occupied by the data channel. When the first transmitting module 370 needs to transmit the channel switch request, the physical line 100 is occupied by the "command channel". Generally speaking, the command channel and the data channel are similar, corresponding to a channel parameter. When both the first serial device 300 and the second serial device 200 record the channel parameter corresponding to the command channel, then the physical line 100 is occupied by the command channel.

Therefore, the first transmitting module 370/the second transmitting module 280 transmit the switch control signal to the second serial device 200/first serial device 300 using additional circuits not for transmitting data in the physical line 100. The second serial device 200/first serial device 300 are notified that the command channel will occupy the physical line 100. The first channel switching module 350/the second channel switching module 260 set the command channel to occupy the physical line 100, and record the channel parameter associated with the command channel.

If the system further requires that first serial device 300/the second serial device 200 use the additional circuit to return a confirmation control signal in response to the switch control signal, then the second channel switching module 260/the first channel switching module 350 records the channel parameter of the command channel after the confirmation control signal returned from the first transmitting module 370/the second transmitting module 280 is received.

The switch control signal and confirmation control signal for entering the command channel can also be substituted by a break signal too. That is, the first transmitting module 370/the second transmitting module 280 transmit a break signal via the physical line 100 to the second serial device 200/the first serial device 300, thereby notifying the second serial device 200/the first serial device 300 that the command channel will occupy the physical line 100. The first channel switching module 350/the second channel switching module 260 switch the command channel to occupy the physical line 100. If the system further requires a response, the first serial device 300/the second serial device 200 also return a break signal as a confirmation control signal in response to the switch to the command channel. The second channel switching module 260/the first channel switching module 350 records the channel parameter of the command channel only after receiving the break signal returned from the first transmitting module 370/the second transmitting module 280.

After the command channel occupies the physical line 100, the first transmitting module 370/the second transmitting module 280 transmit the channel switch request with the header 510 on the circuits for transmitting data. That is, the channel switch request should be transmitted in the command channel. If the system further requires a response, the second serial device 200/the first serial device 300 return the confirmation message in the command channel to make sure that the channel switch request has been received. Afterwards, the first channel switching module 350/the second channel switching module 260 generates a switch control signal to leave the command channel. Afterwards, the first transmitting module 370 the second transmitting module 280 transmit the switch control signal to the second serial device 200/the first serial device 300 via the additional circuits in the physical line 100 that do not transmit data. After the second channel switching module 260/the first channel switching module 350 receive the switch control signal, they record the channel parameter in the channel switch request. If the system further requires a response, the confirmation control signal of leaving the command channel is then returned from the second transmitting module 280/the first transmitting module 370 to the first serial device 300/second serial device 200 via the additional circuits in the physical line 100 that do not transmit data. After that, the data channel corresponding to the channel parameter in the channel switch request occupies the physical line 100.

Likewise, the above-mentioned switch control signal of leaving the command channel and the confirmation control signal of leaving the command channel can be substituted by the break signal when there is no additional circuit other than for transmitting data.

In addition to the command channel, the first transmitting module 370/the second transmitting module 280 can use the additional circuits other than for transmitting data in the physical line 280 to transmit the control signal corresponding to the channel parameter when the control signals and the data are transmitted by different circuits in the physical line 100. After the first channel switching module 350/the second channel switching module 260 receives the control signal, it determines the channel parameter according to the control signal. For example, the physical line 100 contains eight circuits, the first to the eighth circuits. The first and second circuits transmit data. The third to eighth circuits are additional circuits for transmitting control signals. The transmitting direction of the third to fifth circuits is from the second serial device 200 to the first serial device 300. The transmitting direction of the sixth to eighth circuits is from the first serial device 300 to the second serial device 200. When the second serial device 200 determines that the physical line 100 is required to switch from the first data channel to the third data channel, the fourth and fifth circuits transmit control signals. After the first channel switching module 350 receives the control signals transmitted over the fourth and fifth circuits, the binary number "011" formed from the third to fifth circuits is used to determine that the physical line 100 is to be occupied by the third data channel. The second channel switching module 260 sets the third data channel to occupy the physical line 100. In this case, the first channel switching module 350 still needs to use the sixth to eighth circuits to transmit the same confirmation control signal "011" (i.e., the seventh and eighth circuits have control signal transmissions) to the second serial device 200. After the second serial device 200 confirms that the data channel has been switched, the first channel switching module 350/second channel switching module 260 records the channel parameter "011" and the first serial device 300 then could uses the third data channel to transmit data.

Figure 10:
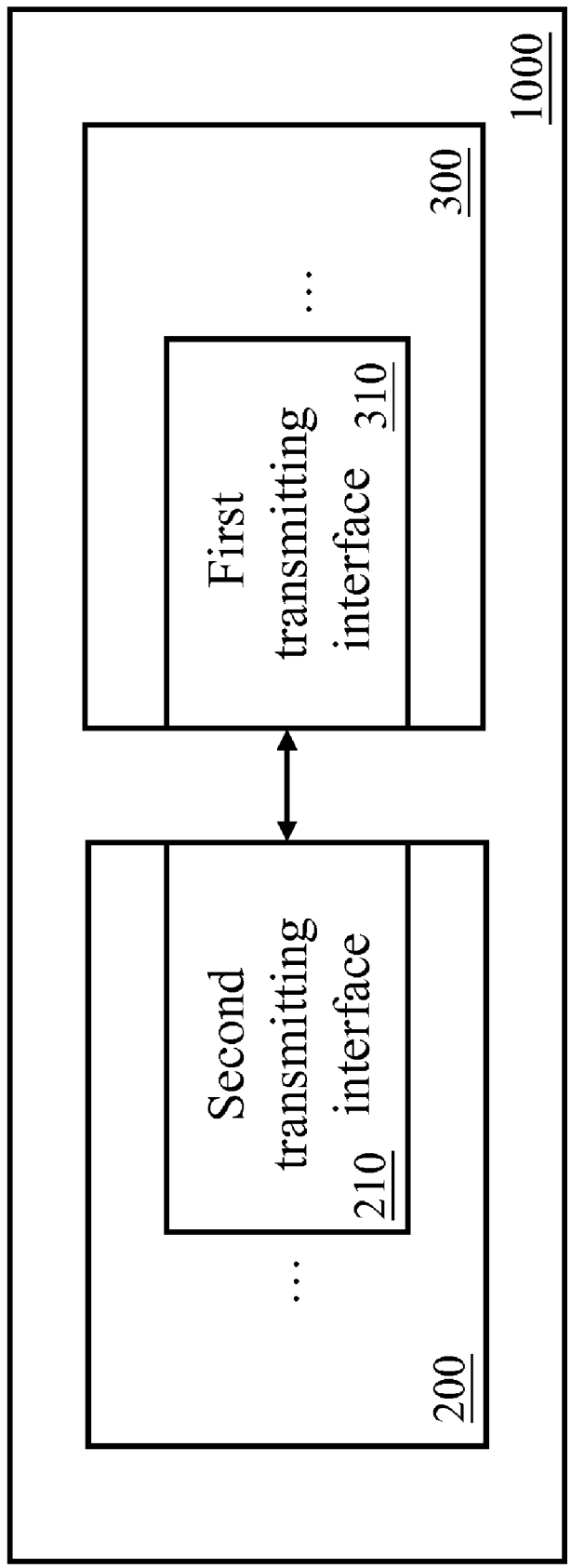
FIG. 10 is a schematic view of a device containing the disclosed first serial device and second serial device.

In fact, as shown in FIG. 10, the invention further provides a device 1000 of a special purpose. The device 1000 includes all the modules in the first serial device 300 and the second serial device 200. Through the interactions between the first serial device 300 and the second serial device 200, the device 1000 can achieve a specific function, such as a door access controller. However, the invention is not limited to this example.

In the following, an embodiment is used to explain the system and method of the invention. In this embodiment, the invention is used in a door access controller (device 1000). The door access controller includes a first serial device 300 and a second serial device 200. The first serial device 300 and the second serial device 200 are electrically connected via a physical line 100 (step 610). Both ends of the physical line 100 are soldered to the first serial device 300 and the second serial device 200, respectively. The first serial device 300 is an embedded communication module in the door access controller, connecting the second serial device 200 to the network. The second serial device 200 is a door access management module in the door access controller. The procedure executing module 230 in the second serial device 200 executes door access management software, which includes a server program for receiving a door access card number, a verifying program for verifying the door access card number, and a client program for transmitting the record of accessing people.

Figure 6:
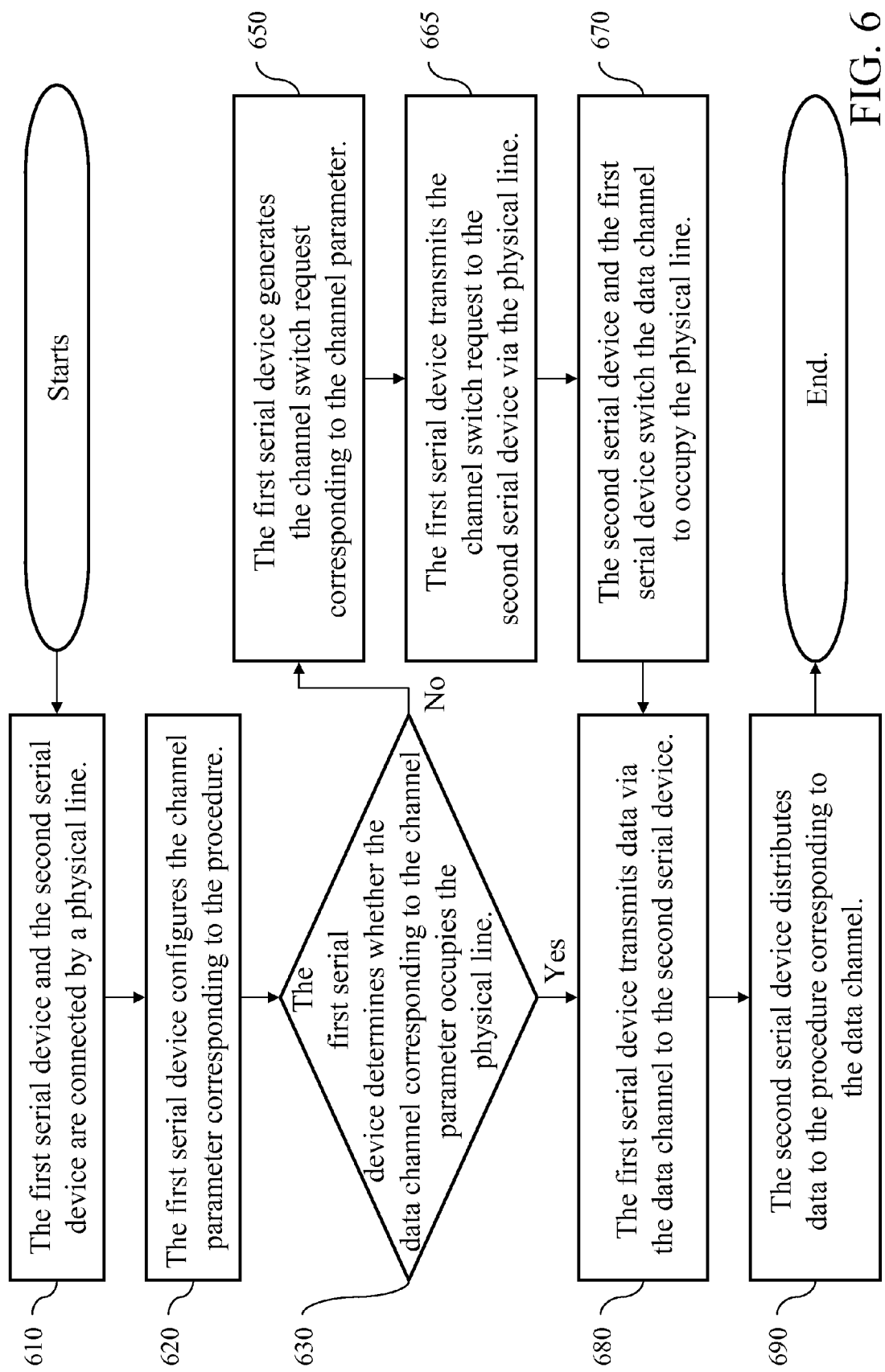
FIG. 6 is a primary flowchart of a first method of using parameters to provide multi-channel serial data transmissions.

Please refer to FIG. 6 for a flowchart of the disclosed method that uses parameters to provide multi-channel serial data transmissions. After a user uses the access management software on a remote management server (remote server 400) to edit the door access card numbers of allowed personnel, the management server updates the edited door access card numbers to the door access controller. There is another remote monitoring server (remote server 800) to receive the data of card numbers transmitted from the door access controller in order to monitor the accessing people.

The first transmitting interface 310 in the embedded communication module (first serial device 300) and the second transmitting interface 210 in the door access management module (second serial device 200) of the door access controller are connected using serial circuits (physical line 100) (step 610). Afterwards, the first serial device 300 receives the environmental parameters corresponding to the channel parameters of all procedures transmitted from the second serial device 200. Therefore, the parameter configuring module 320 in the first serial device 300 configures the channel parameters corresponding to the server program and the client program (step 620) and configures the environmental parameters corresponding to the channel parameters.

Suppose the parameter configuring module 320 configures that the channel parameter corresponding to the server program is "0x01", using the first data channel. And parameter configuring module 320 configures that the channel parameter corresponding to the server program is "0x02", using the second data channel. However, the channel parameters of the invention are not limited to these two examples. Since the server program uses the first data channel, the parameter configuring module 320 configures the environmental parameters for the first data channel, such as the operation mode as "TCP server", the TCP port number, the maximum number of allowed connections, and the IP list of the allowed management servers. The client program uses the second data channel. The parameter configuring module 320 configures the environmental parameters for the second data channel, such as the operation mode as "TCP client", the IP and TCP port number of the monitoring server that the client program would like to connect to, the maximum number of trials for re-establishing connections. In particular, that "operation mode" as "TCP server" means that the first serial device 300 allows the management server (TCP client) to communicate with the server program (TCP server) executing on the second serial device 200 through the TCP connection via the network. That "operation mode" as "TCP client" means that the first serial device 300 (TCP client) establishes the TCP connection with the monitoring server (TCP server) via the network. It then transmits the data generated by the client program executing on the second serial device 200 to the monitoring server.

After the parameter configuring module 320 of the first serial device 300 configures the channel parameter corresponding to the procedure executing in the procedure executing module 230 of the door access controller (step 620), the door access controller can start functioning. Therefore, the first serial device 300 would receive the edited door access card numbers transmitted from the management server. After receiving the edited door access card numbers, it would transmit the received door access card numbers to the server procedure executed on the second serial device 200.

The first serial device 300 determines the data channel used by the received data according to the environmental parameters corresponding to the data channels. In this embodiment, the first serial device 300 compares the IP address of the management server and the source device IP address in the environmental parameters. The comparison result determines that the received door access card numbers should be transmitted via the first data channel to the second serial device 200. Consequently, the first determining module 330 in the first serial device 300 first determines whether the physical line 100 is occupied by the first data channel corresponding to the server program (step 630).

If the first determining module 330 determines that the physical line 100 is occupied by the first data channel, then the first transmitting module 370 in the first serial device 300 would transmit the door access card numbers via the first transmitting interface 310 to the second serial device 200 directly (step 680).

After the second transmitting interface 210 of the second serial device 200 receives the door access card numbers transmitted from the first serial device 300, the second data dispatching module 270 of the second serial device 200 dispatches the door access card numbers to the server program according to that the first data channel is occupying the physical line 100 currently (step 690), so that the server program can update the allowed door access card numbers.

If the first determining module 330 of the first serial device 300 determines that the physical line 100 is not occupied by the first data channel, e.g., occupied by the second data channel instead, then the first channel switching module 350 of the first serial device 300 generates the channel switch request "0x01" corresponding to the first data channel (step 650). After the first transmitting module 370 adds the header 510 "0x10" to the channel switch request, it generates the channel switch request "0x1001", which is then sent via the first transmitting interface 310 to the second serial device 200 (step 665).

After the first channel switching module 350 sends out the channel switch request "0x01", it record the channel parameter "0x01" so that the physical line 100 is occupied by the first data channel. After the second transmitting interface 210 of the second serial device 200 receives the channel switch request "0x1001", the second data dispatching module 270 in the second serial device 200 learns that the received data represent a channel switch request from the header 510 "0x10". Therefore, the non-header part of the channel switch request is extracted. That is, the channel parameter "0x01" is extracted and transferred to the second channel switching module 260 in the second serial device 200 to be processed. The second channel switching module 260 records the channel parameter "0x01" so that the physical line 100 is switched to the first data channel (step 670). Afterwards, the first transmitting module 370 of the first serial device 300 transmits the door access card numbers to the second serial device 200 via the first transmitting interface 310 (step 680).

In fact, after the first channel switching module 350 of the first serial device 300 generates the channel switch request "0x01" corresponding to the first data channel (step 650), in addition to adding the header 510 "0x10" to the channel switch request (step 665), the first transmitting module 370 also directly adds the data to be transmitted after the channel switch request "0x1001", which is the door access card number. The channel switch request "0x1001" and the door access card number are transmitted together via the first transmitting interface 310 to the second serial device 200.

After the second transmitting interface 210 of the second serial device 200 receives the channel switch request "0x1001" and the door access card number, the second data dispatching module 270 in the door access controller learns from the header 510 that the received data include the channel switch request. Therefore, it would extract the channel switch request "0x01" and transfers the request to the second channel switching module 260 of the second serial device 200 for subsequent processing.

When the channel switch request "0x1001" and the door access card number are transmitted simultaneously, the second channel switching module 260 directly records the channel parameter "0x01" and allows the first data channel to occupy the physical line 100. The second data dispatching module 270 of the second serial device 200 dispatches the data after the channel switch request (i.e., the door access card number) to the server program according to the channel parameter "0x01" in the channel switch request (step 690). The server program, thus updates the allowed door access card numbers.

If the channel switch request requires a response, the second channel switching module 260 generates a response "0xFF" to the second transmitting module 280 after receiving the channel switch request "0x1001". It further records the channel parameter "0x01". The second transmitting module 280 adds the header 510 "0x10" to the channel switch response "0xFF". The channel switch response "0x10FF" is transmitted via the second transmitting interface 210 to the first serial device 300. After the first data dispatching module 340 receives "0x10FF" from the first transmitting interface 310, it determines that it is a channel switch response and extracts "0xFF" and sends it to the first channel switching module 350. After the first channel switching module receives the channel switch response "0xFF", it records the channel parameter "0x01" and switches the physical line 100 to the first data channel (step 670). After switching the data channel, the first transmitting module 370 transmits the door access card numbers via the first transmitting interface 310 to the second serial device 200. Then, according to the channel parameter "0x01" recorded by the second channel switching module 260, the procedure executing module 230 in the second serial device 200 would dispatch the data transferred from the second data dispatching module 270 to the server program. That is, the door access card numbers are dispatched to the server program (step 690) so that the server program can update the allowed door access card numbers.

When the amount of the door access card numbers is huge, the combination of the channel switch request and all the door access card numbers, the data length may exceed the maximum length of the transmitting data. According to above reason, the first transmitting module 370 has to send the door access card numbers in separate parts. Therefore, after the first transmitting module 370 sends the first channel switch request and part of the door access card numbers, the rest door access card numbers need not be sent in combination of another channel switch request. In other words, the first transmitting module 370 can directly transmit the rest door access card numbers. In this case, after the second data dispatching module 270 receives the channel switch request and part of the door access card numbers sent from the first transmitting module 370 in the first time, it transmits the channel switch request to the second channel switching module 260 and sends the door access card numbers to the procedure executing module 230. The second channel switching module 260 switches the physical line 100 to the first data channel. Then, when the second data dispatching module 270 receives the rest door access card numbers transmitted from the first transmitting module 370, the second data dispatching module 270 sends the rest door access card numbers to the procedure executing module 230. According to the channel parameter "0x01" recorded by the second channel switching module 260, the procedure executing module 230 would know that the data (the rest door access card numbers) are to be transmitted to the server program. Therefore, the server program executing in the procedure executing module 230 can update the data using the door access card numbers received in two separate parts.

Figure 7:
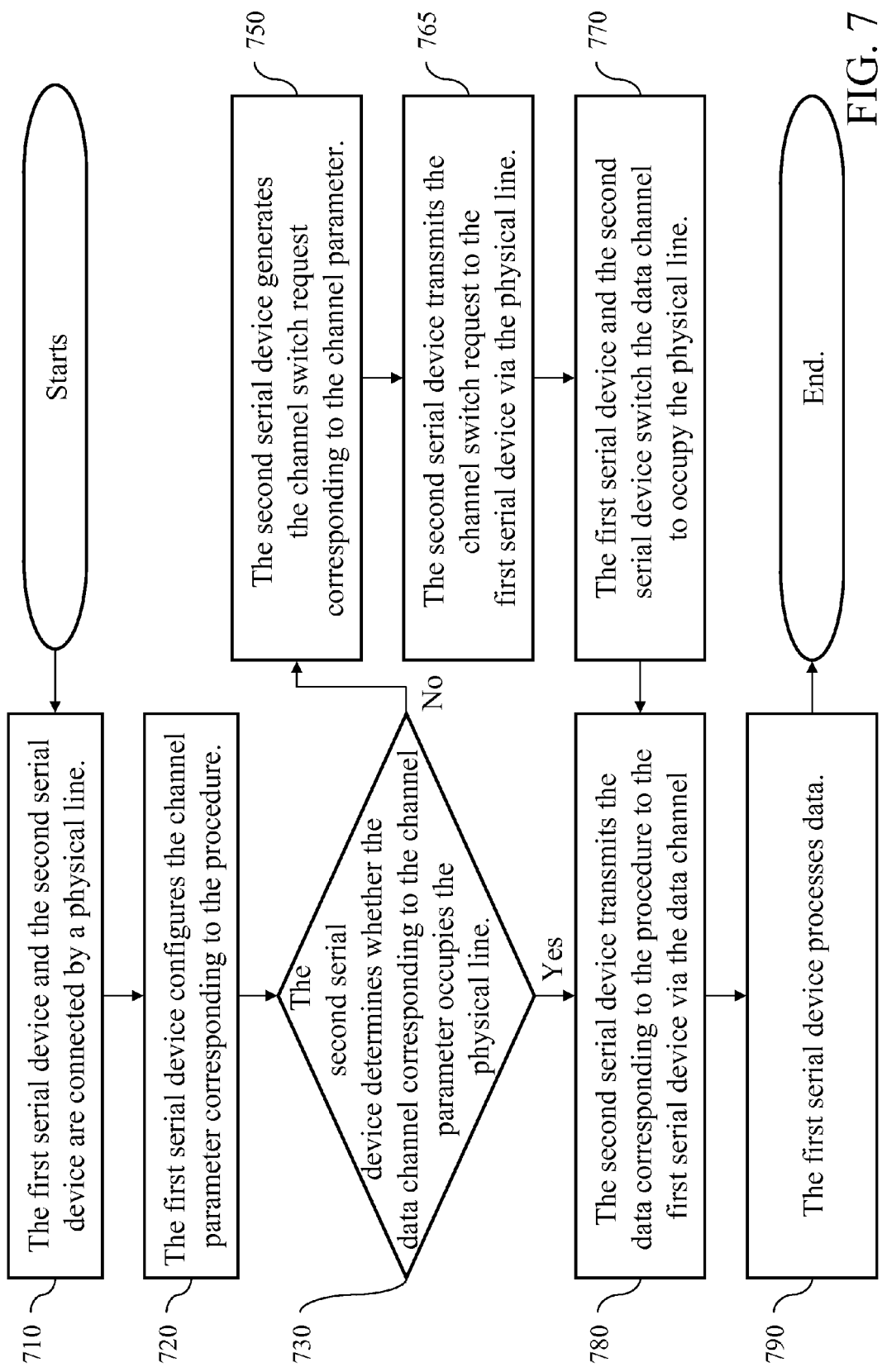
FIG. 7 is a primary flowchart of a first method of using parameters to provide multi-channel serial data transmissions.

Please refer to FIG. 7, which is a flowchart of the disclosed method of using parameters to provide multi-channel serial data transmissions. When someone wants to enter or leave the area managed by the disclosed door access controller, the person applies his access card to the door access controller. The verifying program of the door access management software executing by the procedure executing module 230 of the door access management module (the second serial device 200) contained in the door access controller would obtain the person's door access card number. It then compares the obtained door access card number with the door access card numbers downloaded by the server program before. If the comparison is successful, then the client program of the door access management software executing in the procedure executing module 230 transmits the person's door access card number obtained by the door access management software to the monitoring server via the embedded communication module (first serial device 300) of the door access controller.

Suppose the second transmitting interface 210 of the second serial device 200 and the first transmitting interface 310 of the first serial device 300 are already connected via the physical line 100 (step 710). The second determining module 250 of the second serial device 200 first determines whether the physical line 100 is occupied by the second data channel corresponding to the client program (step 730).

If the second determining module 250 of the second serial device 200 determines that the physical line 100 is occupied by the second data channel, then the second transmitting module 280 of the second serial device 200 transmits the person's door access card number to the first serial device 300 via the second transmitting interface 210 (step 780).

After the first transmitting interface 310 of the first serial device 300 receives the door access card number transmitted from the client program in the procedure executing module 230 of the door access controller, the data processing module 380 of the first serial device 300 would find that the target remote monitoring server by reading the environmental parameters (i.e. operation mode, IP, port etc.) corresponding to the second data channel and then transfer the data received by the first transmitting interface 310 (i.e., the person's door access card number and time) to the monitoring server.

If the second determining module 250 of the second serial device 200 determines that the physical line 100 is not occupied by the second data channel, but the first data channel instead, then the second channel switching module 260 of the second serial device 200 generates the channel switch request "0x02" corresponding to the second data channel (step 750). After the second transmitting module 280 adds the header 510 "0x10" to the channel switch request, it generates a channel switch request "0x1002". The channel switch request "0x1002" is then transmitted via the second transmitting interface 210 to the first serial device (step 765).

After the first channel switching module 350 in the first serial device 300 extracts the channel parameter "0x02" from the channel switch request "0x1002", it records the channel parameter "0x02". If the channel switch request requires a response, then "0xFF" is generated for the first transmitting module 370 before the channel parameter "0x02" is recorded. The first transmitting module 370 adds the header 510 "0x10" to the channel switch response "0x10FF", which is then sent via the first transmitting interface 310 to the second serial device 200. After the second transmitting interface 210 receives "0x10FF", the second data dispatching module 270 extracts it and sends it to the second channel switching module 260. After the second channel switching module 260 receives the channel switch response "0xFF", it records the channel parameter "0x02", switching the physical line 100 to the second data channel (step 770). Afterwards, the second transmitting module 280 in the second serial device 200 transmits the person's door access card number to the first serial device 300 via the second transmitting interface 210 (step 780). The data processing module 380 of the first serial device 300 processes the data after the channel switch request (step 790). That is, according to the environmental parameters corresponding to the second data channel, the person's door access card number and time received by the first transmitting interface 310 are transmitted to the monitoring server.

Besides, suppose the second transmitting module 280 of the second serial device 200 further adds the data to be transmitted to the first serial device 300 (i.e., the person's door access card number) after the channel switch request "0x1002". The second transmitting interface 210 of the second serial device 200 then transmits the packet containing the channel switch request "0x1002" and the person's door access number to the first serial device 300.

After the first transmitting interface 310 of the first serial device 300 receives the channel switch request "0x1002" and the person's door access card number, the first data dispatching module 340 of the first serial device 300 extracts the non-header part in the channel switch request "0x1002". That is, it extracts the channel parameter "0x02" and transmits it to the first channel switching module 350. The first channel switching module 350 records the channel parameter "0x02" and lets the second data channel to occupy the physical line 100. Afterwards, the data processing module 380 processes the data after the channel switch request (step 790). That is, according to the environmental parameters corresponding to the second data channel, the person's door access card number and time received by the first transmitting interface 310 are transmitted to the monitoring server.

Figure 8:
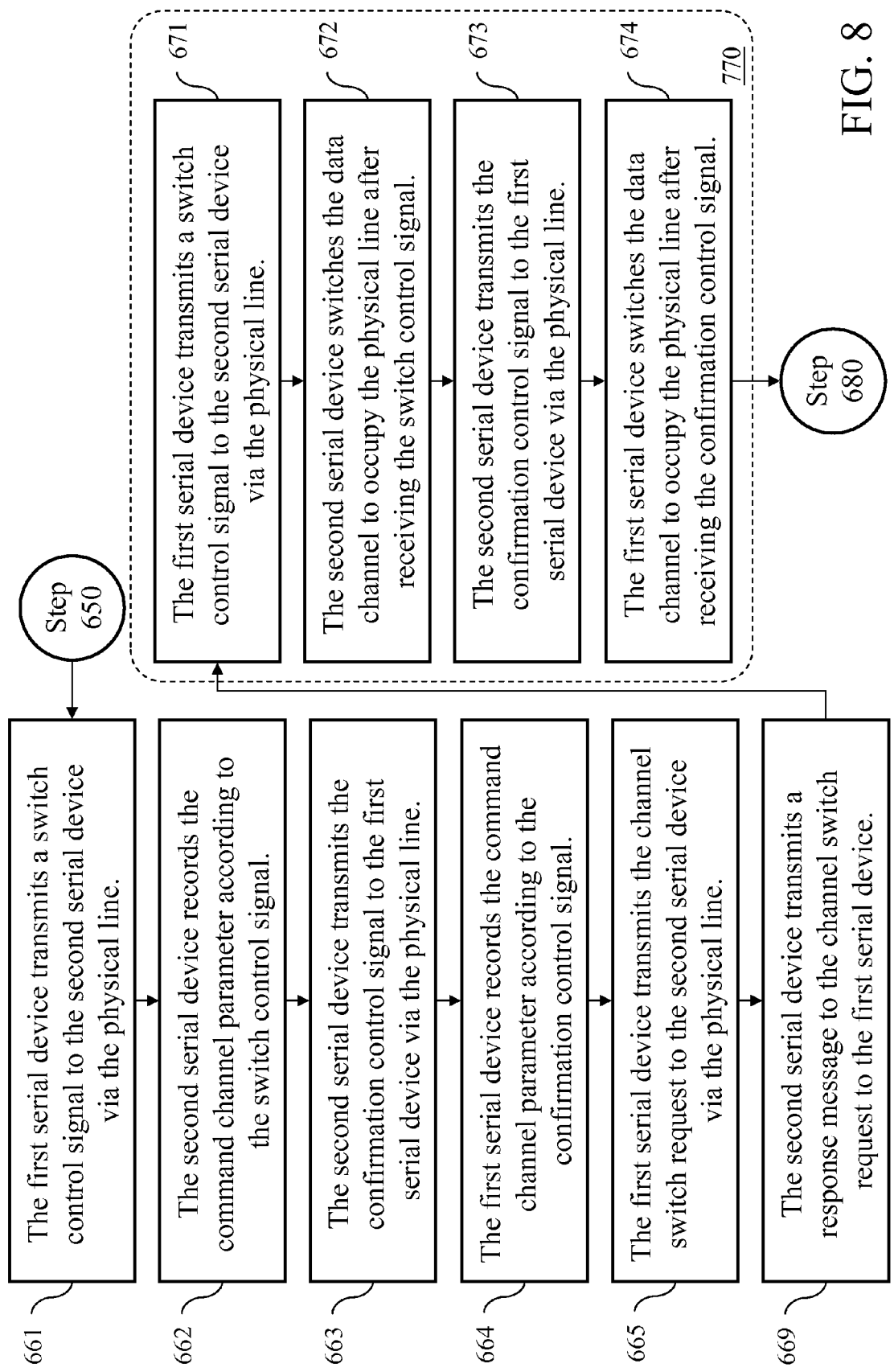
FIG. 8 is an auxiliary flowchart of a second method of using parameters to provide multi-channel serial data transmissions.
Figure 9:
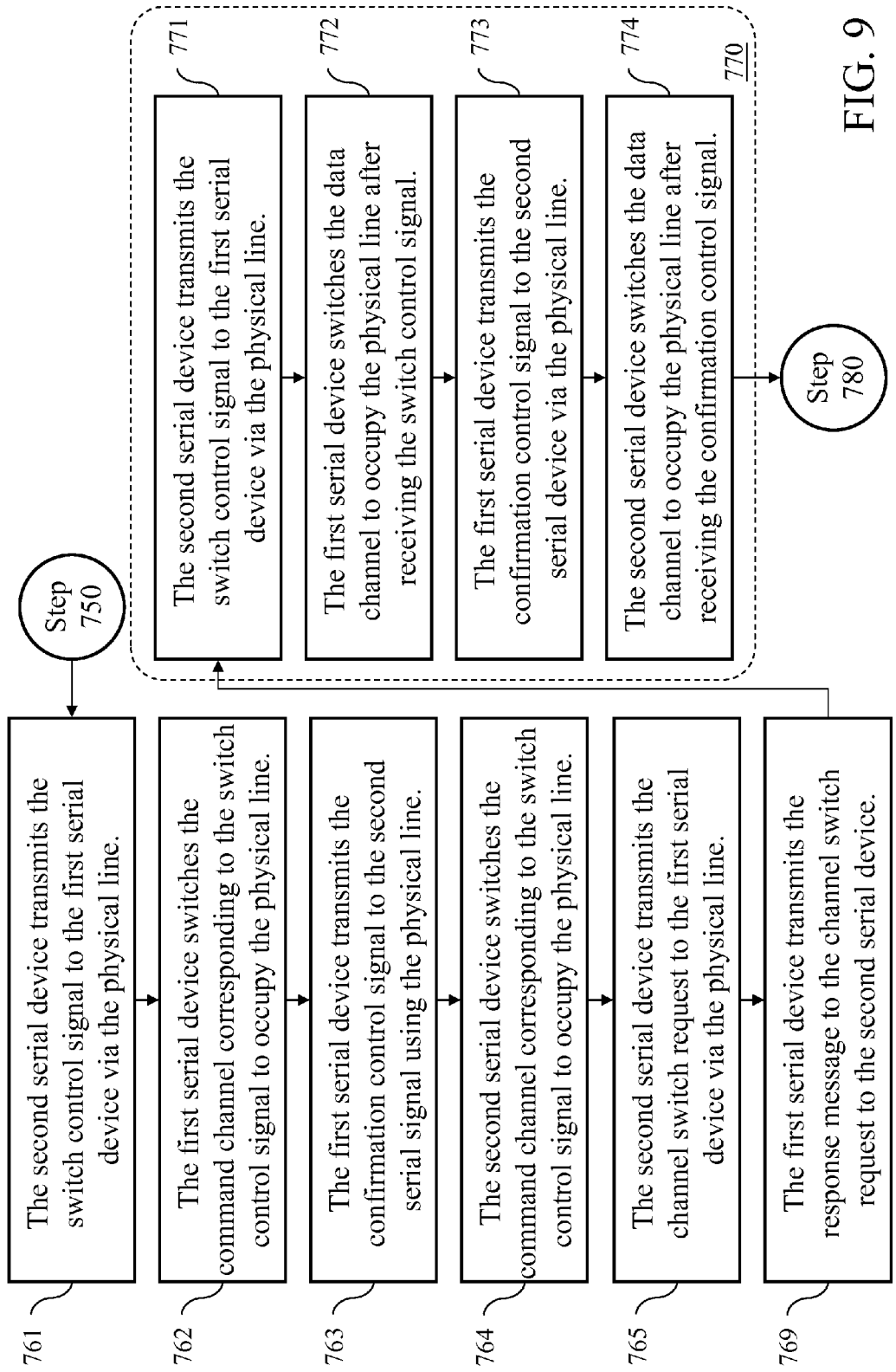
FIG. 9 is an auxiliary flowchart of a second method of using parameters to provide multi-channel serial data transmissions.

In the above embodiment, the data transmitted from the second serial device 200 to the first serial device 300 or the data transmitted from the first serial device 300 to the second serial device 200 cannot contain the header 510. Otherwise, the first data dispatching module 340 in the first serial device 300 or the second data dispatching module 270 in the second serial device 200 determines that the data after "0x10" are the channel parameter. So the first transmitting module 370 of the first serial device 300 or the second transmitting module 280 of the second serial device 200 needs to first check whether the transmitted data contain "0x10" before transmitting the data. If so, then "0x10" should be added with an escape character, such as "0x1010", so that the first data dispatching module 340 of the first serial device 300 or the second data dispatching module 270 of the second serial device 200 does not misidentify the data as the channel switch request. After adding the escape character to the data to be transmitted, the first data dispatching module 340 of the first serial device 300 or the second data dispatching module 270 of the second serial device 200 needs to restore the data with the escape character. For this, the problem can be readily solved if the physical line 100 uses different circuits to transmit control signals and data. In the following, please refer to FIGS. 6 and 7 in companion with FIGS. 8 and 9.

Suppose the first serial device 300 receives the allowed door access card numbers and need to transmit them to the second serial device 200 for database updating. Assume that the first transmitting interface 310 of the first serial device 300 and the second transmitting interface 210 of the second serial device 200 are already connected via the physical line 100 (step 610). The parameter configuring module 320 of the first serial device 300 has already configured the first channel parameter "0x01" and the second channel parameter "0x02" for the sever program and the client program executing in the procedure executing module 230 of the second serial device 200 (step 620). Afterwards, the first determining module 330 of the first serial device 300 first determines whether the physical line 100 is occupied by the first data channel corresponding to the server program (step 630).

If the first determining module 330 of the first serial device 300 determines that the physical line 100 is occupied by the second data channel, then the first transmitting module 370 uses a circuit in the physical line 100 that is not used for transmitting data to transmit the control signal of switching to the command channel to the second serial device 200 (step 661).

After the second transmitting interface 210 of the second serial device 200 receives the control signal of switching to the command channel, the second data dispatching module 270 notifies the second channel switching module 260, which then record the channel parameter in the command channel (step 662). The confirmation of the control signal of switching to the command channel is returned via a circuit not for data transmissions in the physical line 100 to the first serial device 300 (step 663).

After the first transmitting interface 310 of the first serial device 300 receives the confirmation of the control signal of switching to the command channel, the first data dispatching module 340 notifies the first channel switching module 350, which then records the channel parameter of the command channel (step 664). Thus, the physical line 100 is occupied by the command channel.

Afterwards, the first channel switching module 350 of the first serial device 300 generates a channel switch request "0x01" corresponding to the first data channel. The first transmitting module 370 transmits the channel switch request containing the channel parameter "0x01" to the second serial device 200 via the first transmitting interface 310 (step 665).

In fact, after the first transmitting module 370 of the first serial device 300 transmits the channel switch request containing the channel parameter "0x01" to the second serial device 200 (step 665), if the second channel switching module 260 of the second serial device 200 agrees with the channel switch, the second transmitting module 280 can transmit a response corresponding to the channel switch request, such as "0xFF" to the first serial device 300 (step 669). However, the invention is not limited to this possibility.

Afterwards, the first transmitting module 370 of the first serial device 300 uses the circuits not for transmitting data in the physical line 100 to transmit the control signal of leaving the command channel to the second serial device 200 (step 671).

After the second transmitting interface 210 of the second serial device 200 receives the control signal of leaving the command channel, the second data dispatching module 270 notifies the second channel switching module 260, which then records the channel parameter "0x01" received previously. That is, it records the channel parameter corresponding to the server program, so that the physical line 100 is now occupied by the first data channel (step 672). The confirmation of the control signal of leaving the command channel is returned via the circuit different from data transmissions in the physical line 100 to the first serial device 300 (step 673).

After the first transmitting interface 310 of the first serial device 300 receives the confirmation of the control signal of leaving the command channel, the first data dispatching module 340 notifies the first channel switching module 350 to leave the command channel and then records the channel parameter "0x01" corresponding to the server program. That means the physical line 100 is switched to the first data channel (step 674). Therefore, the first data channel occupies the physical line 100 (step 670).

Afterwards, the first transmitting module 370 of the first serial device 300 can transmit the door access card numbers to the second serial device 200 via the first transmitting interface 310 (step 680). Therefore, when the second transmitting interface 210 of the second serial device 200 receives the door access card numbers, the second data dispatching module 270 of the second serial device 200 would dispatch the data received by the first transmitting interface 310 (i.e., the door access card numbers) to the server program according to that the first data channel occupies the physical line 100 (step 690). Finally, the server program could update the allowed door access card numbers.

Suppose the second transmitting interface 210 of the second serial device 200 and the first transmitting interface 310 of the first serial device 300 are already connected via the physical line 100 (step 710). When some person uses its door access card on the door access controller, the verifying program of the door access software executing in the procedure executing module 230 of the second serial device 200 obtains the door access card number of the person. The verifying program then check if the obtained door access card number could be found in the internal door access card number database which was received by the server program before. If the obtained door access card number could be found in the database, then the client program in the door access management software executing in the procedure executing module 230 transmits this card number via the first serial device 300 to the remote monitoring server. For above transmission could be done, the second determining module 250 of the second serial device 200 should determines whether the physical line 100 is occupied by the second data channel corresponding to the client program first (step 730).

Therefore, when the second determining module 250 of the second serial device 200 determines that the physical line 100 is occupied by the first data channel, then the second transmitting module 280 of the second serial device 200 uses a circuit not for data transmissions in the physical line 100 to transmit the control signal of switching to the command channel to the first serial device 300 (step 761).

After the first data dispatching module 340 of the first serial device 300 receives the control signal of switching to the command channel via the first transmitting interface 310, it notifies the first channel switching module 350, which then records the channel parameter of the command channel (step 762). The first transmitting module 370 of the first serial device 300 transmits the confirmation of the control signal of switching to the command channel to the second serial device 200 via the first transmitting interface 310 (step 763).

After the second serial device 200 receives the confirmation of control signal of switching to the command channel, it records the channel parameter of the command channel, thereby switching the command channel to occupy the physical line 100 (step 764). The command channel is then used to transmit the channel switch request containing the second channel parameter "0x02" to the first serial device 300 (step 765).

After the first transmitting interface of the first serial device 300 receives the channel switch request, if the first channel switching module 350 agrees, then the first transmitting module 370 of the transmitting module further transmits a response of channel switch request to the second serial device 200 (step 769).

Afterwards, the second transmitting module 280 of the second serial device 200 uses circuits not for transmitting data in the physical line 100 to transmit the control signal of leaving the command channel to the first serial device 300 (step 771).

After the first transmitting interface 310 of the first serial device 300 receives the control signal of leaving the command channel, the first data dispatching module 340 notifies the first channel switching module 350, which then records the second channel parameter "0x02" previously received when the command channel occupies the physical line 100, thereby switching the second data channel to occupy the physical line 100 (step 772). A confirmation of the control signal of leaving the command channel is further sent to the second serial device 200 (step 773).

After the second transmitting interface 210 of the second serial device 200 receives the confirmation of the control signal of leaving the command channel, the second data dispatching module 270 notifies the second channel switching module 260, which then records the second channel parameter "0x02", thereby switching the second data channel to occupy the physical line 100 (step 774). The second data channel thus occupies the physical line 100 (step 770). Therefore, the second transmitting module 280 of the second serial device 200 transmits the person's door access card number to the first serial device 300 via the second transmitting interface 210 (step 780). Afterwards, the data processing module 380 of the first serial device 300 processes the data after the channel switch request (step 790). That is, the person's door access card number and the access time thereof are sent to the monitoring server defined by the environmental parameters.

In the above embodiment, the first serial device 300 and the second serial device 200 may not be built in the same device (device 1000). That is, the first serial device 300 and the second serial device 200 can be two independent devices connected by a serial circuit (the physical line 100). The same procedure can be applied here to provide the same functions.

In summary, the invention differs from the prior art in that it uses the first serial device 300 to configure the channel parameters corresponding to the procedures executing on the second serial device 200. When exchanging data with the procedure executing on the second serial device 200, the invention determines whether the data channel corresponding to the procedure occupies the physical line 100. If so, then the first serial device 300 and the procedure on the second serial device 200 exchange data. Otherwise, the first serial device 300 transmits a channel switch request to the second serial device 200. After the first serial device 300 and the second serial device 200 both set the physical line 100 to be occupied by the data channel of the procedure, the first serial device 300 and the procedure on the second serial device 200 exchange data. Using this technique, the invention solves the problem in the prior art that when the second serial device requires to use different ways (different operation modes of the first serial device) to communicate to remote servers via a single serial port of the first serial device, the first serial device has to waste time switching between different operation modes. The invention also solves the problem in the prior art that when the first serial device runs in a operation mode but the second serial device requires to send/receive different data to/from different remote servers via a single serial port of the first serial device. Therefore, the invention achieves the goal of letting a single serial port to have data channels of different operation modes or connections.

The invention further enables the procedure executing in the procedure executing module 230 of the second serial device 200 to simultaneously use multiple data channels to exchange data with different devices. In the following, a second embodiment is used to explain the operation of the disclosed system and method. This embodiment is a sensor monitoring system, which includes a sensor controller (second serial device 200) and an embedded communication module (first serial device 300). They are electrically connected via the second transmitting interface 210 and the first transmitting interface 310 (FIG. 7, step 710). In particular, the procedure executing module 230 of the second serial port 200 executes a monitoring program.

After the monitoring program executing on the procedure executing module 230 of the second serial device 200 detects the temperature, moisture, and voltage of the environment, the detected data are transmitted to two different monitoring centers. That is, the monitoring program executing in the procedure executing module 230 needs to exchange data with two different devices. The second transmitting interface 210 in the second serial device 200 transmits two groups of environmental parameters to the first serial device 300.

Please refer to FIG. 7. After the first serial device 300 receives the environmental parameters, it configures the channel parameters corresponding to the environmental parameters and monitoring program (step 720). For example, there are a first channel parameter and a second channel parameter. Afterwards, when the monitoring program executing in the procedure executing module 230 transmits such data as temperature, moisture or voltage, the second determining module 250 of the second serial device 200 first determines whether the physical line 100 is occupied by another data channel (step 730).

Suppose the monitoring program requires transmitting the temperature, moisture to the first monitoring center and the voltage to the second monitoring center. When the monitoring program transmits the temperature and moisture data to the first monitoring center, the second determining module 250 in the second serial device 200 determines that the physical line 100 is occupied by the first data channel. In this case, the second transmitting module 280 of the second serial device 200 transmits the detected temperature data to the first serial device 300 via the second transmitting interface 210 (step 780).

After the first transmitting interface 310 of the first serial device 300 receives the temperature and moisture data transmitted from the monitoring program in the procedure executing module 230 of the second serial device 200, the data processing module 380 executing in the first serial device 300 transmits the temperature and moisture data transferred by the first transmitting interface 310 via the first data dispatching module 340 to the first monitoring center according to the environmental parameters corresponding to the first data channel.

When the monitoring program transmits the voltage data to the second monitoring center, the second determining module 250 of the second serial device 200 determines that the physical line 100 is occupied by the first data channel. Therefore, the second channel switching module 260 of the second serial device 200 generates the channel switch request "0x02" corresponding to the second data channel (step 750). After the second transmitting module 280 adds the header "0x10" to the channel switch request, it generates a channel switch request "0x1002". The second transmitting interface 210 then transmits the channel switch request "0x1002" to the first serial device 300 (step 765).

After the first transmitting interface 310 of the first serial device 300 receives the channel switch request "0x1002", the first data dispatching module 340 of the first serial device 300 extracts the channel parameter "0x02" from the channel switch request "0x1002" and transfers it to the first channel switching module 350. Afterwards, the first channel switching module 350 records the channel parameter "0x02" and further generates the response of agreeing with the channel switch. After the first transmitting module 370 of the first serial device 300 transmits the channel switch agreement via the first transmitting interface 310 back to the second serial device 200, the second channel switching module 260 of the second serial device 200 records the channel parameter "0x02" for the physical line to be occupied by the second data channel. Afterwards, the second transmitting module 280 of the second serial device 200 transmits via the second transmitting interface 210 the voltage data detected by the monitoring program to the first serial device 300 (step 780). The data processing module 380 of the first serial device 300 then transmits the voltage data received by the first transmitting interface 310 to the second monitoring center according to the environmental parameters corresponding to the second data channel.

During the process of switching the data channel between the second serial device 200 and the first serial device 300, it varies with such conditions as the number of the lines in the physical line 100 and whether the channel switch request is transmitted in the same packet as the data. For example, suppose the second determining module 250 of the second serial device 200 determines that the physical line 100 is occupied by the first data channel. After the second channel switching module 260 of the second serial device 200 generates the channel switch request "0x02" corresponding to the second data channel (step 750), the channel parameter "0x02" is directly recorded without waiting for the first serial device 300 to return its response. At the same time, the second transmitting module 280 adds the header 510 "0x01" to the channel switch request and generates the channel switch request "0x1002". The second transmitting module 280 transmits the channel switch request "0x1002" to the first serial device 300 via the second transmitting interface 210 (step 765).

After the first transmitting interface 310 of the first serial device 300 receives the channel switch request "0x1002", the first data dispatching module 340 of the first serial device 300 extracts the channel parameter "0x02" from the channel switch request "0x1002" and transfers it to the first channel switching module 350. Afterwards, the first channel switching module 350 records the channel parameter "0x02". Since the second channel switching module 260 of the second serial device 200 also records the channel parameter "0x02", the physical line 100 is occupied by the second data channel without the response to the channel switch request transmitted from the first serial device 300.

In this embodiment if the monitoring program executing in the procedure executing module 230 sends the three detected data to the same monitoring center, then the second transmitting interface 210 of the second serial device 200 only sends one environmental parameter to the first serial device 300. The subsequent steps are the same as those in the above-mentioned embodiment. Therefore, they are not repeated here again.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of using parameters to provide multi-channel serial data transmissions, comprising the steps of:
    connecting a first serial device and a second serial device executing at least one procedure by a physical line;
    configuring at least one channel parameter corresponding to the procedure by the first serial device;
    determining that the physical line is occupied by a data channel corresponding to the channel parameter by the second serial device and transmitting data corresponding to the procedure via the data channel to the first serial device;
    when the physical line is determined by the second serial device not occupied by the data channel, generating a channel switch request corresponding to the channel parameter;
    transmitting the channel switch request via the physical line from the second serial device to the first serial device;
    switching the data channel to occupy the physical line by the first serial device and the second serial device; and
    transmitting the data via the data channel from the second serial device to the first serial device.

2. The method of claim 1, wherein the second serial device generates the channel switch request containing a header and the channel parameter and the channel switch request is transmitted via at least one circuit in the physical line in the step of transmitting the channel switch request by the second serial device.

3. The method of claim 1, wherein the second serial device transmits the control signal corresponding to the channel parameter via the line in the physical line not for transmitting data in the step of transmitting the channel switch request by the second serial device.

4. The method of claim 1, wherein the step of transmitting the channel switch request via the physical line from the second serial device to the first serial device further includes the steps of:
- transmitting a switch control signal from the second serial device to the first serial device via the physical line;
- switching a command channel corresponding to the control signal by the first serial device and the second serial device to occupy the physical line; and
- transmitting the channel switch request from the second serial device to the first serial device via the command channel.

5. The method of claim 1 further comprising the step of transmitting a response message corresponding to the channel switch request from the first serial device to the second serial device.

6. The method of claim 1, wherein the step of switching the data channel to occupy the physical line by the first serial device and the second serial device includes the steps of:
- transmitting a switch control signal from the second serial device to the first serial device via the physical line;
- switching the data channel to occupy the physical line by the first serial device after the first serial device receives the switch control signal;
- transmitting a confirmation control signal form the first serial device to the second serial device via the physical line; and
- switching the data channel to occupy the physical line by the second serial device after the second serial device receives the confirmation control signal.

7. A method of using parameters to provide multi-channel serial data transmissions, comprising the steps of:
- connecting a first serial device and a second serial device executing at least one procedure by a physical line;
- configuring at least one channel parameter corresponding to the procedure by the first serial device;
- determining that the physical line is not occupied by a data channel corresponding to the channel parameter by the first serial device and generating a channel switch request corresponding to the channel parameter;
- transmitting the channel switch request from the first serial device to the second serial device via the physical line;
- switching the data channel to occupy the physical line by the first serial device and the second serial device;
- transmitting the data via the data channel from the first serial device to the second serial device; and
- dispatching the data by the second serial device to the procedure corresponding to the data channel.

8. The method of claim 7, wherein the first serial device generates a channel switch request containing a header and the channel switch request corresponding to the channel parameter and the channel switch request is transmitted via at least one circuit of the physical line in the step of transmitting the channel switch request by the first serial device.

9. The method of claim 7, wherein the first serial device transmits the control signal corresponding to the channel parameter via the line in the physical line not for transmitting data in the step of transmitting the channel switch request by the first serial device.

10. The method of claim 7, wherein the step of transmitting the channel switch request via the physical line from the first serial device to the second serial device further includes the steps of:
- transmitting a switch control signal from the first serial device to the second serial device via the physical line;
- switching a command channel corresponding to the control signal by the second serial device and the first serial device to occupy the physical line; and
- transmitting the channel switch request from the first serial device to the second serial device via the command channel.

11. The method of claim 7 further comprising the step of transmitting a response message corresponding to the channel switch request from the second serial device to the first serial device.

12. The method of claim 7, wherein the step of switching the data channel to occupy the physical line by the second serial device includes the steps of:
- transmitting a switch control signal from the first serial device to the second serial device via the physical line;
- switching the data channel to occupy the physical line by the second serial device after the second serial device receives the switch control signal;
- transmitting a confirmation control signal form the second serial device to the first serial device via the physical line; and
- switching the data channel to occupy the physical line by the first serial device after the first serial device receives the confirmation control signal.

13. A device of using parameters to provide multi-channel serial data transmissions connected with a second serial device via a physical line with the second serial device executing at least one procedure, the device comprising:
- a first transmitting interface connected with the physical line;
- a first data dispatching module connected with the first transmitting interface;
- a parameter configuring module, which configures at least one channel parameter corresponding to the procedure according to at least one environmental parameter received by the first data dispatching module, wherein the environmental parameter corresponds to the procedure and the channel parameter corresponds to at least one data channel;
- a first determining module, which determines whether the data channel occupies the physical line when the device needs to transmit first data to the procedure;
- a first channel switching module, which generates a channel switch request corresponding to the channel parameter when the first determining module determines that the data channel does not occupy the physical line and switches the data channel to occupy the physical line, and switches the data channel to occupy the physical line according to the channel switch request received by the first data dispatching module via the first transmitting interface;
- a data processing module, which processes the second data received by the first data dispatching module via the first transmitting interface according to the data channel occupying the physical line; and
- a first transmitting module, which transmits the channel switch request via the first transmitting interface to the second serial device when the first determining module determines that the data channel does not occupy the physical line, and transmits the first data to the second serial device when the first determining module determines that the data channel occupies the physical line.

14. The device of claim 13, wherein the channel switch request includes a header and the channel parameter.

15. The device of claim 13, wherein the physical line include at least two circuits, the first transmitting interface uses at least one of the circuits to transmit the first data and uses the circuit not for transmitting data to transmit the channel switch request, and the channel switch request is the control signal corresponding to the channel parameter.

16. The device of claim 13, wherein the first transmitting module adds the first data after the channel switch request.

17. The device of claim 13, wherein the first transmitting module further uses the first transmitting interface to transmit a first switch control signal to the second serial device, the first data dispatching module further uses the first transmitting interface to receive a first confirmation control signal from the second serial device in response to the first switch control signal, and the first channel switching module further switches the data channel to occupy the physical line according to the first confirmation control signal.

18. The device of claim 13, wherein the first data dispatching module further uses the first transmitting interface to receive a second switch control signal transmitted from the second serial device, the first transmitting module further uses the first transmitting interface to transmit a second confirmation control signal in response to the second switch control signal to the second serial device, and the first channel switch module further switches a command channel to occupy the physical line according to the second confirmation control signal.

19. The device of claim 13, wherein the first transmitting module transmits a response message to the channel switch request to the second serial device.

20. A device of using parameters to provide multi-channel serial data transmissions connected with a second serial device via a physical line with the second serial device executing at least one procedure, the device comprising:
    a first serial device, which includes:
        a first transmitting interface connected with the physical line;
        a first data dispatching module connected with the first transmitting interface;
        a parameter configuring module, which configures at least one channel parameter corresponding to the procedure according to at least one environmental parameter received by the first data dispatching module, wherein the environmental parameter corresponds to the procedure and the channel parameter corresponds to at least one data channel;
        a first determining module, which determines whether the data channel occupies the physical line when the first serial device needs to transmit first data to the procedure;
        a first channel switching module, which generates a channel switch request corresponding to the channel parameter when the first determining module determines that the data channel does not occupy the physical line and switches the data channel to occupy the physical line, and switches the data channel to occupy the physical line according to the channel switch request received by the first data dispatching module via the first transmitting interface;
        a data processing module, which processes the second data received by the first data dispatching module via the first transmitting interface according to the data channel occupying the physical line; and
        a first transmitting module, which transmits the channel switch request via the first transmitting interface when the first determining module determines that the data channel does not occupy the physical line, and transmits the first data when the first determining module determines that the data channel occupies the physical line; and
    a second serial device, which includes:
        a second transmitting interface connected with the first transmitting interface via the physical line;
        a procedure executing module for executing the procedure;
        a second data dispatching module connected with the second transmitting interface for receiving the channel switch request and the first data via the second transmitting interface and for dispatching the first data to the procedure executing module;
        a second determining module, which determines whether the data channel occupies the physical line when the procedure generates the second data;
        a second channel switching module, which generates the channel switch request when the second determining module determines that the data channel does not occupy the physical line and switches the data channel to occupy the physical line, and switches the data channel to occupy the physical line according to the channel switch request received by the second data dispatching module via the second transmitting interface; and
        a second transmitting module, which transmits the channel switch request via the second transmitting interface when the second determining module determines that the data channel does not occupy the physical line, and transmits the second data to the first serial device via the second transmitting interface when the second determining module determines that the data channel occupies the physical line.

21. The device of claim 20, wherein the channel switch request includes a header and the channel parameter.

22. The device of claim 20, wherein the physical line include at least two circuits, the first transmitting interface uses at least one of the circuits to transmit the first data, the second transmitting interface uses the circuits of the first data to transmit the second data, the first transmitting interface and the second transmitting interface use the circuits of the physical line not for transmitting the first data to transmit the channel switch request, and the channel switch request is the control signal corresponding to the channel parameter.

23. The device of claim 20, wherein the first transmitting module adds the first data after the channel switch request.

24. The device of claim 20, wherein the second data dispatching module receives a first switch control signal transmitted from the first serial device via the second transmitting interface, the second transmitting module returns a first confirmation control signal in response to the first switch control signal to the first serial device via the second transmitting interface, and the first channel switching module switches a command channel to occupy the physical line according to the first confirmation control signal.

25. The device of claim 20, wherein the first data dispatching module receives a second switch control signal transmitted from the second serial device via the first transmitting interface, the first transmitting module returns a second confirmation control signal in response to the second switch control signal to the second serial device via the first transmitting interface, and the second channel switching module switches a command channel to occupy the physical line according to the second confirmation control signal.

26. The device of claim 20, wherein the first transmitting module transmits a first switch control signal to the second serial device via the first transmitting interface, the first data dispatching module receives a first confirmation control signal in response to the first switch control signal from the second serial device via the first transmitting interface, and the first channel switching module switches the data channel to occupy the physical line according to the first confirmation control signal.

27. The device of claim 20, wherein the second transmitting module transmits a second switch control signal to the first serial device via the second transmitting interface, the second data dispatching module receives a second confirmation control signal in response to the second switch control signal from the first serial device via the second transmitting interface, and the second channel switching module switches the data channel to occupy the physical line according to the second confirmation control signal.

28. The device of claim 20, wherein the second transmitting module further adds the second data after the channel switch request.

29. The device of claim 20, wherein the first transmitting module transmits a response message to the channel switch request to the second serial device.

30. The device of claim 20, wherein the second transmitting module transmits a response message to the channel switch request to the first serial device.

* * * * *